(12) United States Patent
Rihani et al.

(10) Patent No.: US 11,194,558 B2
(45) Date of Patent: Dec. 7, 2021

(54) APPLICATION MIGRATION SYSTEM

(71) Applicant: Accenture Global Solutions Limited, Dublin (IE)

(72) Inventors: Raed Zahi Rihani, Falls Church, VA (US); Stefan C. Hellstrom, Denver, CO (US); Christopher Ray Brown, Springfield, VA (US); Ashley N. Porta, Abingdon, MD (US); Jonovan Jerome Sanders, Silver Spring, MD (US); Michael Alexander Vasquez, Washington, DC (US); Christopher Michael Mariano, Falls Church, VA (US)

(73) Assignee: ACCENTURE GLOBAL SOLUTIONS LIMITED, Dublin (IE)

( * ) Notice: Subject to any disclaimer, the term of this patent is extended or adjusted under 35 U.S.C. 154(b) by 0 days.

(21) Appl. No.: 15/725,477

(22) Filed: Oct. 5, 2017

(65) Prior Publication Data
US 2018/0107466 A1 Apr. 19, 2018

Related U.S. Application Data

(60) Provisional application No. 62/408,192, filed on Oct. 14, 2016.

(51) Int. Cl.
G06F 8/60 (2018.01)
G06F 8/61 (2018.01)
G06F 9/48 (2006.01)

(52) U.S. Cl.
CPC .............. *G06F 8/60* (2013.01); *G06F 8/64* (2013.01); *G06F 9/4856* (2013.01)

(58) Field of Classification Search
CPC ............ G06F 8/60; G06F 9/4856; G06F 8/64
(Continued)

(56) References Cited

U.S. PATENT DOCUMENTS 6,944,169 B1 * 9/2005 Yoshizawa ............ H04L 41/082 370/410
6,968,535 B2 11/2005 Sterling et al.
(Continued)

FOREIGN PATENT DOCUMENTS

AU 2012/0276003 1/2013

OTHER PUBLICATIONS

Andrikopoulos et al., "Supporting the Migration of Applications to the Cloud through a Decision Support System", [Online], 2013, pp. 565-572, [Retrieved from Interneton Aug. 16, 2021], <https://ieeexplore.ieee.org/stamp/stamp.jsp?tp=&arnumber=6676741>(Year: 2013).*

(Continued)

*Primary Examiner* — S. Sough
*Assistant Examiner* — Znegpu Wei
(74) *Attorney, Agent, or Firm* — Crowell & Moring LLP

(57) ABSTRACT

An application-centric modernization and migration (AMM) architecture delivers AMM as a service to enterprises to automate migrating applications to new environments. In this regard, the architecture implements data migration functionality in concert with application code migration, environment provisioning, and post-migration configuration. The joint migration of application data and application code effectively provides a complete migration of an application. The architecture may also define and deliver a GUI portal through which an application owner provides application-specific metadata to drive the AMM.

20 Claims, 28 Drawing Sheets

(58) Field of Classification Search
USPC .................................................... 717/177
See application file for complete search history.

(56) References Cited

U.S. PATENT DOCUMENTS

| | | | |
|---|---|---|---|
| 7,239,877 B2* | 7/2007 | Corneille | G06F 8/61 455/456.3 |
| 8,020,144 B2 | 9/2011 | Yang et al. | |
| 8,443,355 B2 | 5/2013 | Wiese et al. | |
| 8,677,309 B2 | 3/2014 | Xie et al. | |
| 8,752,014 B2 | 6/2014 | Harmon | |
| 9,201,639 B2 | 12/2015 | Kumar et al. | |
| 9,354,851 B2 | 5/2016 | Li et al. | |
| 9,575,979 B1 | 2/2017 | McClintock et al. | |
| 9,614,781 B1 | 4/2017 | Goltzman et al. | |
| 9,811,367 B2* | 11/2017 | Rouwet | G06F 9/45558 |
| 9,830,146 B2 | 11/2017 | Rector et al. | |
| 10,084,723 B2 | 9/2018 | Mordani et al. | |
| 2005/0075115 A1* | 4/2005 | Corneille | G06F 8/61 455/456.3 |
| 2008/0077605 A1* | 3/2008 | Vasu | G06F 9/44505 |
| 2008/0104573 A1 | 5/2008 | Singla et al. | |
| 2009/0144393 A1* | 6/2009 | Kudo | G06F 9/5044 709/218 |
| 2010/0050156 A1 | 2/2010 | Bonanno et al. | |
| 2010/0122248 A1 | 5/2010 | Robinson et al. | |
| 2011/0099548 A1 | 4/2011 | Shen et al. | |
| 2011/0107327 A1* | 5/2011 | Barkie | G06F 8/63 717/176 |
| 2012/0036245 A1 | 2/2012 | Dare et al. | |
| 2012/0174079 A1 | 7/2012 | Luh | |
| 2013/0007216 A1* | 1/2013 | Fries | G06F 9/4856 709/218 |
| 2013/0262638 A1 | 10/2013 | Kumarasamy et al. | |
| 2013/0297973 A1 | 11/2013 | Hyland et al. | |
| 2013/0298104 A1 | 11/2013 | Kletsky et al. | |
| 2013/0346616 A1* | 12/2013 | Miki | H04L 29/08144 709/226 |
| 2014/0006342 A1* | 1/2014 | Love | G06F 17/30345 707/609 |
| 2014/0040328 A1 | 2/2014 | Offer | |
| 2014/0189671 A1 | 7/2014 | Dujmovic et al. | |
| 2014/0245290 A1 | 8/2014 | Gupta et al. | |
| 2014/0331240 A1 | 11/2014 | Zhao et al. | |
| 2015/0019479 A1* | 1/2015 | Buehne | G06F 17/303 707/609 |
| 2015/0052531 A1* | 2/2015 | Helak | G06F 9/4856 718/102 |
| 2015/0074659 A1 | 3/2015 | Madsen et al. | |
| 2015/0096011 A1 | 4/2015 | Watt | |
| 2015/0372878 A1* | 12/2015 | Ganesan | H04L 43/16 709/223 |
| 2016/0036724 A1* | 2/2016 | Syed | H04L 41/5025 709/226 |
| 2016/0139944 A1* | 5/2016 | Rouwet | G06F 9/45558 718/1 |
| 2016/0225403 A1* | 8/2016 | Hostetter | G11B 20/0021 |
| 2016/0357439 A1* | 12/2016 | Uehara | G06F 3/0647 |
| 2017/0012819 A1 | 1/2017 | Raheja et al. | |
| 2017/0048314 A1* | 2/2017 | Aerdts | H04L 67/1097 |
| 2017/0161057 A1 | 6/2017 | Khazanchi et al. | |
| 2017/0206017 A1* | 7/2017 | Sun | G06F 3/065 |
| 2017/0212732 A1* | 7/2017 | Kaduwela | G06F 8/34 |
| 2017/0286456 A1 | 10/2017 | Wenzel et al. | |
| 2018/0060066 A1 | 3/2018 | Rihani et al. | |
| 2018/0260241 A1* | 9/2018 | Khurange | G06F 3/0604 |

OTHER PUBLICATIONS

U.S. Appl. No. 62/361,153, filed Jul. 12, 2016, Rihani et al.
European Patent Office, Extended European Search Report from European Patent Application No. 17195639.4 dated Mar. 16, 2018, pp. 1-7.
Examination Report No. 2 for Australian Application No. 2017245281 dated Jun. 19, 2018, pp. 1-4.
Australian Patent Office, Examination Report No. 1 for Australia Patent Application No. 2017245281 dated Mar. 7, 2018, pates 1-6.
Non-Final Rejection in U.S. Appl. No. 15/647,697 dated Jun. 28, 2018 (19p).
Examination Report No. 3 in Australia application No. 2017245281, dated Nov. 23, 2018, pp. 1-3.
Office Action, and Notice of References Cited, in U.S. Appl. No. 15/647,697, dated Jan. 8, 2019, pp. 1-22.
Notice of Allowance in U.S. Appl. No. 15/647,697, dated May 3, 2019.
Fathi, et al, "Advanced Condition Monitoring Services in Product Lifecycle Management", 2007, IEEE (Year: 2007).
Srinivasan, "An integration f [amework for product lifecycle management", Aug. 2007, ELSEVIER (Year: 2007).
Abramovici, et al., "Application of PDM technology for Product Life Cycle Management", 1997, Springer Link (Year: 1997).
Candido, et al., "Service-Oriented Infrastructure to Support the Deployment of Evolvable Production Systems", Nov. 2011, IEEE, vol. 7, No. 4 (Year: 2011).

* cited by examiner

Enterprise Service Center

Welcome, Janavan Sanders | logout

MY APPLICATION / DEMO APPLICATION DASHBOARD / MIGRATE GCSS LEGACY PRODUCTION ENVIRONMENT

Service Catalog
Service Center
  My Applications
  Order Services >
  My Managed Services >
  My Requests >
My Applications
Administrative
  Change Requests
  Approvals
  Notifications
  Announcements
  Reports
  Knowledge Base
Support
  Help Desk GCSS Legacy Production Migrate Environment Here you can choose a target for your Legacy environment to migrate your services and infrastructure

CHOOSE ENVIRONMENT > CHOOSE TARGET MAPPINGS > FINALIZE MIGRATION

Please choose an environment as the migration target

GCSS Legacy Production ⟶ Target Environment

Search

Q Search your environment...

CCE Tests
Environment

Service Provider
Amazon Web Services

VIEW Environment

Enterprise Service Center
Welcome, Janavan Sanders | logout

MY APPLICATION / DEMO APPLICATION DASHBOARD / CCE TEST ENVIRONMENT DETAILS

Service Catalog
Service Center
  My Applications
  Order Services >
  My Managed Services >
  My Requests >
My Applications >
Administrative
  Change Requests
  Approvals
  Notifications — 1904
  Announcements
  Reports
  Knowledge Base
Support
  Help Desk CCE Test Environment
Environment Details The Environment Details page allows application owners to define and edit environments. From here they can specify environment attributes as well as manage the networks and network resources within the environment.

Environment Details

| Type | Service Provider |
| Development | Amazon Web Services |

Networks - 1

⊘ Environment Costs
NETWORKS - 1
EST. STARTUP ~ $0.00
EST. MONTHLY ~ $182.00

VIEW COSTS

EDIT ENVIRONMENT

+ ADD NETWORK

⊘ Demo Network   Status: Pending - 10.0.1.20/24  [+ ADD NETWORK Resource | ▥ Deprovision Network]

| MaaSDemoDB | MaaSDemoApp |
| DNS.... | DNS.... |
| Status Pending | Status Pending |

Enterprise Service Center                                    Welcome, Janavan Sanders | logout

MY APPLICATION / DEMO APPLICATION DASHBOARD / CCE TEST ENVIRONMENT DETAILS

The Environment Details page allows application owners to define and edit environment from here they are specify environment attributes as well as manage the networks and network resources within the environment.

VIEW COSTS

Environment Details

| Type | Service Provider |
|---|---|
| Development | Amazon Web Services |

EDIT ENVIRONMENT

Networks - 1

◇ Demo Network    Status: Pending - 10.0.1.20/24  [+ ADD NETWORK Resource] [* Deprovision Network]

+ ADD NETWORK

| MaaSDemoDB | MaaSDemoApp |
|---|---|
| DNS.... | DNS.... |
| Status Provisioning | Status Provisioning |

2302

Service Catalog
Service Center
  My Applications
  Order Services
  My Managed Services >
  My Requests >
My Applications >
Administrative
  Change Requests
  Approvals
  Notifications
  Announcements
  Reports
  Knowledge Base
Support
  Help Desk

APPLICATION MIGRATION SYSTEM

PRIORITY CLAIM

This application claims priority to U.S. Provisional Patent Application Ser. No. 62/408,192, filed 14 Oct. 2016, and titled Application Migration System, which is incorporated by reference in its entirety.

TECHNICAL FIELD

This disclosure relates to application migration to new systems and deployment environments.

BACKGROUND

The processing power, memory capacity, available disk space, and other resources available to computer systems have increased exponentially in recent years. Diverse computer systems are deployed worldwide in great numbers to host an immense number of data platforms running extremely diverse applications. Improvements in moving applications between systems and deployment environments will further advance the capabilities of these computer systems.

BRIEF DESCRIPTION OF THE DRAWINGS

FIGS. 4-28 show examples of application migration graphical user interfaces that the system shown in FIGS. 1 and 2 may implement and deliver.

DETAILED DESCRIPTION

The architecture described below provides application-centric modernization and migration (AMM). The architecture may deliver AMM as a service to enterprises to automate migrating applications to new environments. In this regard, the architecture implements data migration functionality jointly and in concert with application code migration, environment provisioning, and post-migration configuration. The joint migration of application data and application code effectively provides a complete migration of an application. The architecture may also define and deliver a GUI portal through which an application owner provides application-specific metadata to drive the AMM.

Figure 1:
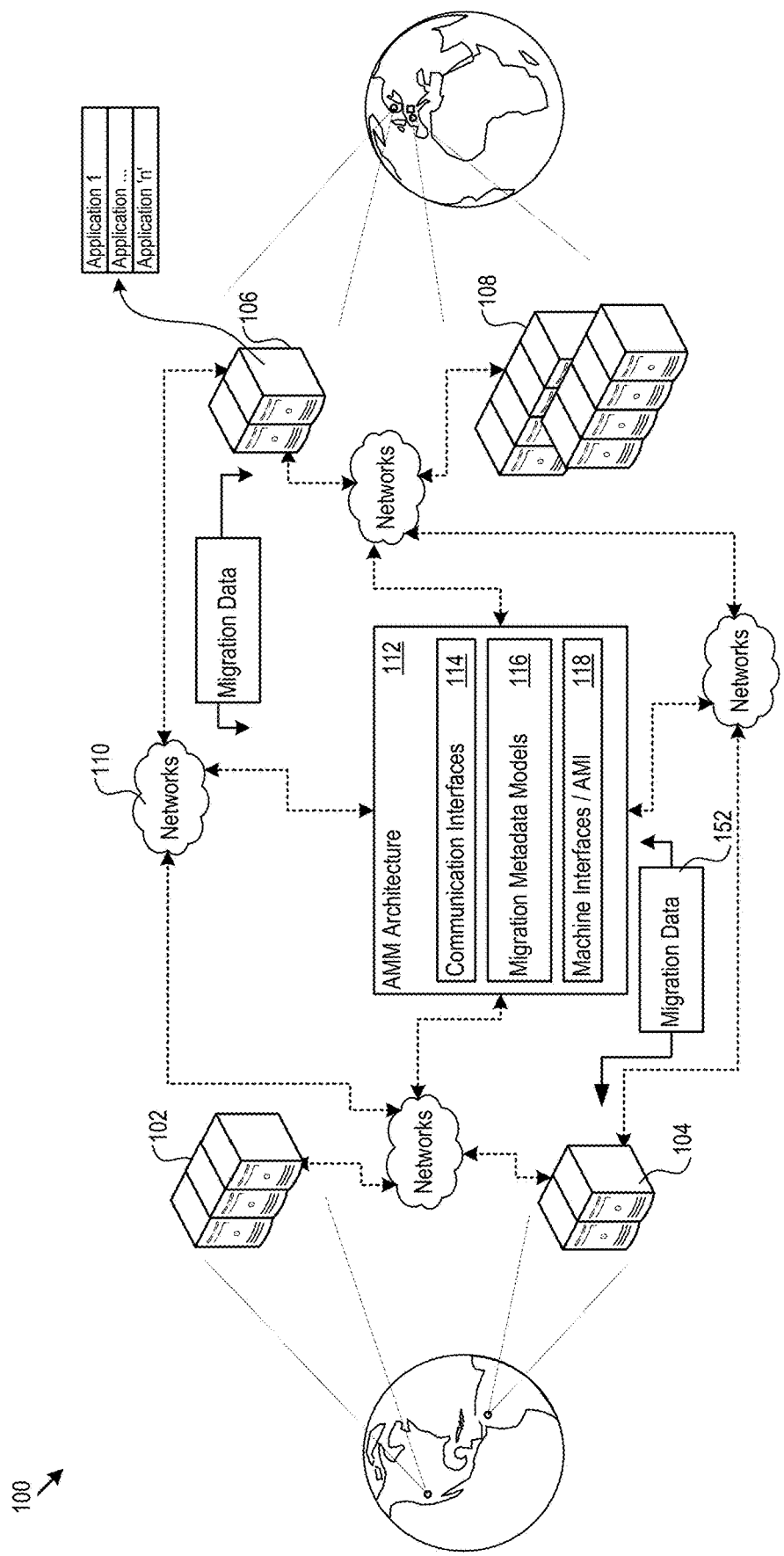
FIG. 1 shows a global network architecture.
Figure 2:
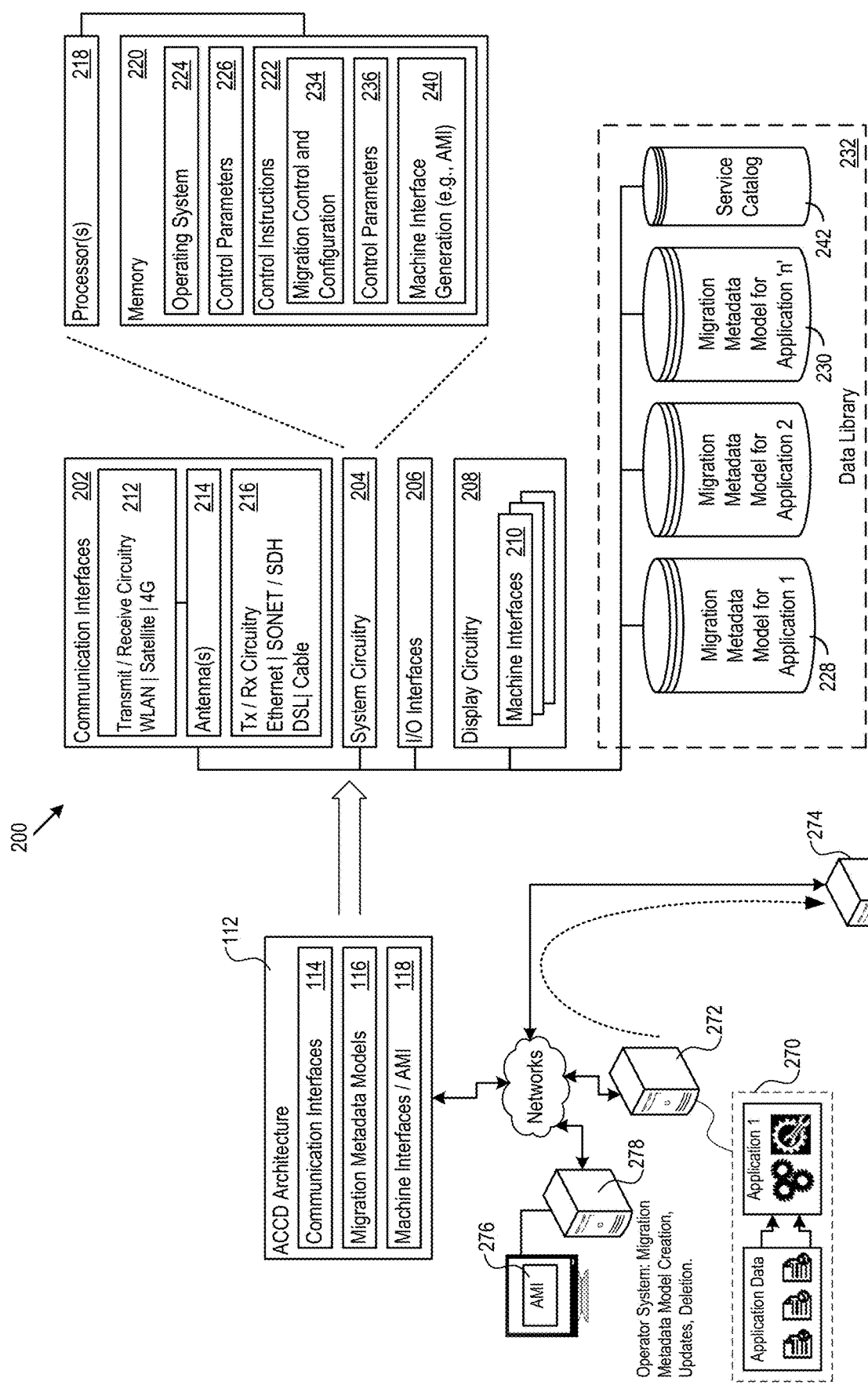
FIG. 2 shows an example implementation of an application migration architecture.

FIGS. 1 and 2 provide an example context for the discussion below of the technical solutions in AMM. The examples in FIGS. 1 and 2 show one of many possible different implementation contexts. In that respect, the technical solutions are not limited in their application or implementation to the architectures and systems shown in FIGS. 1 and 2. Instead, the technical solutions are applicable to many other system implementations, architectures, and connectivities.

FIG. 1 shows a global network architecture 100. Connected through the global network architecture 100 are geographically distributed data platforms 102, 104, 106, and 108. The data platforms 102-108 host and execute any number of applications of any type. A few examples include web servers, database management systems, data analytics software, computational chemistry applications, messaging systems (e.g., email, text, and chat systems), order provisioning and instantiation, and product ordering, delivery, and logistics systems.

Throughout the global network architecture 100 are networks, e.g., the network 110. The networks provide connectivity between the data platforms 102-108 and the AMM architecture 112. The networks 110 may include private and public networks defined over any pre-determined and possibly dynamic internet protocol (IP) address ranges.

The architecture 112 performs complex technical application lifecycle management. As an overview, the architecture 112 may include communication interfaces 114, migration metadata models 116, and machine interface circuitry 118. The communication interfaces 114 connect the architecture 112 to the networks 110 and the data platforms 102-108, and facilitate the communication of migration data 152. As a few examples, the migration data 152 may include application data, application code, source environment configuration, target environment configuration, environment and application configuration parameters, or instructions of any kind relating to application migration. The architecture 112 delivers machine interfaces (which may include Graphical User Interfaces (GUIs)) for improved machine interaction with the architecture 112 regarding the application migration.

FIG. 2 shows an example implementation 200 of the architecture 112. The example implementation 200 includes communication interfaces 202, system circuitry 204, input/output (I/O) interfaces 206, and display circuitry 208 that generates machine interfaces 210 locally or for remote display, e.g., in a web browser running on a local or remote machine. The machine interfaces 210 and the I/O interfaces 206 may include GUIs, touch sensitive displays, voice or facial recognition inputs, buttons, switches, speakers and other user interface elements.

The communication interfaces 202 may include wireless transmitters and receivers ("transceivers") 212 and any antennas 214 used by the transmit and receive circuitry of the transceivers 212. The transceivers 212 and antennas 214 may support WiFi network communications, for instance, under any version of IEEE 802.11, e.g., 802.11n or 802.11ac. The communication interfaces 202 may also include physical transceivers 216. The physical transceivers 216 may provide physical layer interfaces for any of a wide range of communication protocols, such as any type of Ethernet, data over cable service interface specification (DOCSIS), digital subscriber line (DSL), Synchronous Optical Network (SONET), or other protocol.

The system circuitry 204 may include hardware, software, firmware, or other circuitry in any combination. The system circuitry 204 may be implemented, for example, with one or more systems on a chip (SoC), application specific integrated circuits (ASIC), microprocessors, discrete analog and digital circuits, and other circuitry. The system circuitry 204 is part of the implementation of any desired functionality in the architecture 112. As just one example, the system circuitry 204 may include one or more instruction processors 218 and memories 220. The memory 220 stores, for example, control instructions 222 and an operating system 224. In one implementation, the processor 218 executes the control instructions 222 and the operating system 224 to carry out any desired functionality for the architecture 112. The control parameters 226 provide and specify configuration and operating options for the control instructions 222, operating system 224, and other functionality of the architecture 112.

The architecture 112 may include databases and database table structures in a data library 232 hosted on volume storage devices, e.g., hard disk drives (HDDs) and solid state disk drives (SDDs). The storage devices may define and store database table structures that the control instructions 222 access, e.g., through a database control system, to perform the functionality implemented in the control instructions 222.

In the example shown in FIG. 2, the data library 232 stores one or more migration metadata models, e.g., the models 228 and 230. The migration metadata models describe, e.g., the components of an application (e.g., database structure, CPU/Memory specifications, and software components) and the data that the application works on (e.g., database names and tables, directory and file structures, data set names and locations, and other data). The migration metadata models help define the configuration of any predefined application and its data. The metadata may also define and specify where and how the execution environment should be provisioned, e.g. on a public or private cloud host, and with what resources, e.g., number of servers, databases, network connections, CPU, RAM, and disk space, so that a provisioning tool may automate the creation of the execution environment.

The control instructions 222 include application migration instructions 234. The application migration instructions 234 execute application migration tasks guided by the predefined migration metadata model built specifically for that application. The data library 232, migration instructions 234, control parameters 236, machine interface generation instructions 240, and the structure and content of the generated GUIs improve the functioning of the underlying computer hardware itself. That is, these features (among others described below) are specific improvements in way that the underlying computer system operates. The improvements facilitate more efficient, accurate, consistent, and precise execution of complex application migration tasks, fewer resources, across a wide range of application platforms whether local or remote, and according to any predetermined governance model chosen by an organization.

The improved functioning of the underlying computer hardware itself achieves further technical benefits. For example, the architecture 112 avoids lack of automation, reduces manual intervention, reduces the possibility for human error, and therefore increases application migration efficiency and reduces wait times. The architecture 112 also avoids a lack of centralization for service management, and the typically associated increased hardware, software, and maintenance costs. The architecture 112 helps to ensure that the application migration tools are configured consistently and in accordance with policy and governance defined by an enterprise.

As noted above, the architecture 112 delivers AMM as a service to enterprises to automate migrating applications to new environments. The architecture 112 implements a joint migration of application data and application code, along with environment provisioning and post-migration configuration. The joint migration of application data and application code effectively provides a complete migration of an application. Further details are provided below.

The architecture 112 includes application configuration circuitry configured to register a specific application through an application migration interface. As one example, the application configuration circuitry may include the hardware processing resources shown in FIG. 2, including the migration control and configuration instructions 234. The application configuration circuitry identifies an application data store (e.g., an application database) required for execution of the specific application, assigns the specific application to an application-specific metadata model, and adds, into the application-specific metadata model, application data store identification metadata and application data store location metadata characterizing the application data store. The application data store identification metadata may, for instance, provide a name or other identifying string for the application data store, while the application data store location metadata may, for instance, provide an IP address, URI, file system reference, or other location where the application data store resides.

The application configuration circuitry initiates migration of the specific application through the application migration interface. To that end, the application configuration circuitry may request deployment of a target environment for the specific application, recognizes that the specific application relies on a specific application data store for execution of the specific application, and in response jointly migrates the application data store into the target environment along with the specific application.

Note that the architecture 112 may receive an identification of the target environment through the application migration interface, and add the identification into the application-specific metadata model. The application-specific metadata model may further include source environment metadata that characterizes a source environment in which the specific application currently runs. In that case, the architecture 112 may execute mapping rules configured to determine the target environment from the source environment.

In connection with the migration, the application configuration circuitry is configured to issue provisioning instructions for instantiating the application database in the target environment. The provisioning instructions may direct instantiation of the application database into the target environment as a virtualized application database or a non-virtualized application database. The source and target environments may themselves be any combination of virtualized and non-virtualized environments.

In some implementations, the architecture 112 supports data masking. For instance, the architecture 112 may implement masked data field identifiers that identifying specific data fields in the application database as masked data fields. The application configuration circuitry prevents data entries in the masked data fields from appearing in the application database in the target environment. The application configuration circuitry may accomplish this by clearing the data fields during transfer to the target environment, providing filler or dummy data for the data fields, or in other manners.

In one implementation, the architecture 112 includes machine interface circuitry 118 that defines and delivers an application migration interface (AMI) 276, e.g., to an operator system 278. The communication interfaces 202 deliver the AMI 276 to the operator system 278, e.g., as HTML5 web page data. The AMI 276 may include a set or series of linked and interactive GUIs through which an application owner at the operator system 278 navigates to provide substantive data input to specify and direct application registration and migration. That is, the AMI 276 facilitates migrating, e.g., an application and data bundle 270 from a current environment 272 to a target environment 274.

Figure 3:
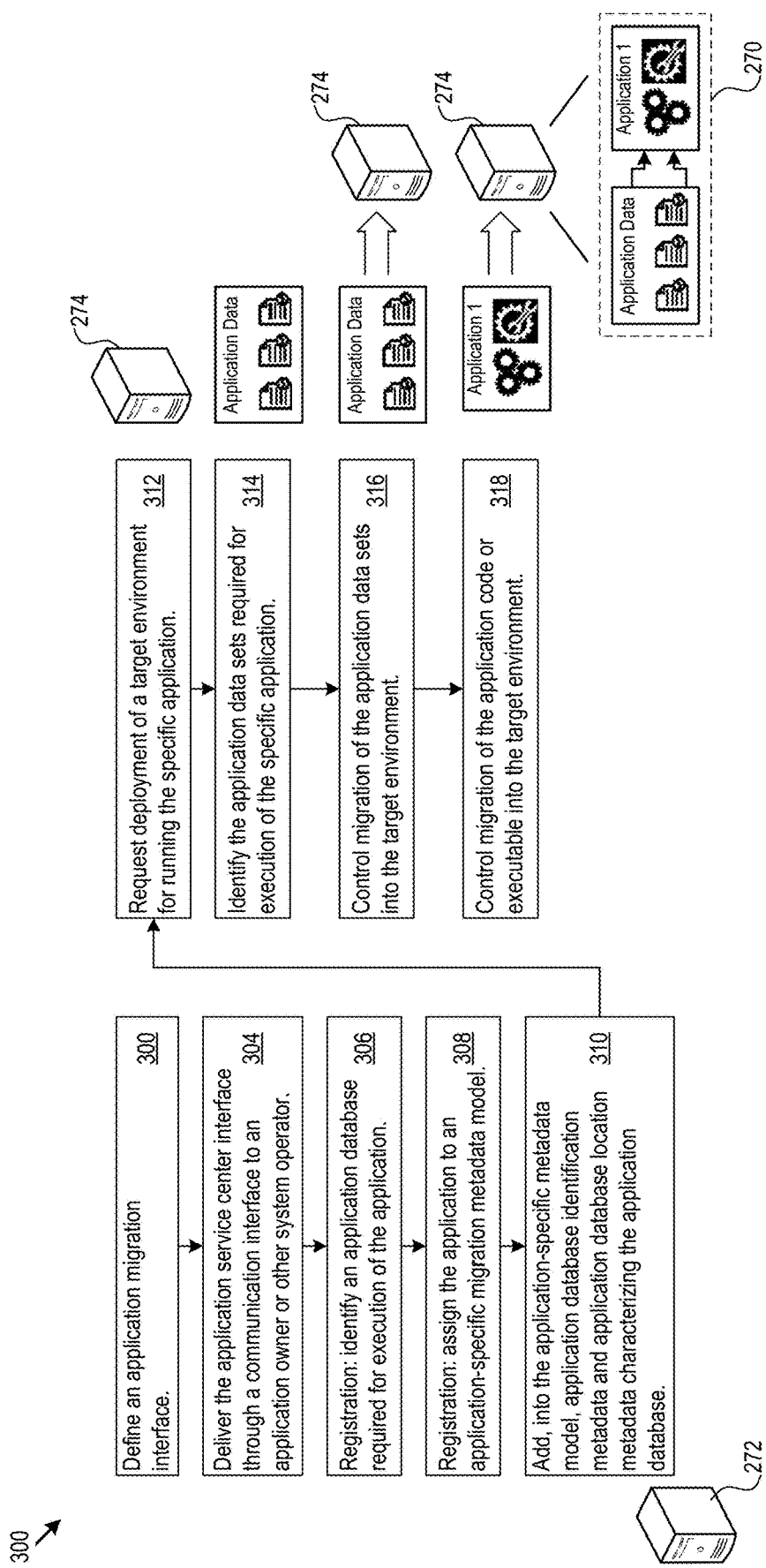
FIG. 3 shows an example flow diagram for application migration executed by the migration architecture.

FIG. 3 shows an example flow diagram of logic 300 for application migration that the migration architecture 112 may implement and execute. In the example of FIG. 3, the architecture 112 defines an application migration interface (302), e.g., the GUIs that implement the AMI 276, and delivers the application migration interface through a communication interface to an application owner or other system operator (304).

The migration architecture 112 registers a specific application through the application migration interface. The registration may include identifying an application database, data files, directory structure or other data set required for execution of the specific application (308). Registration may also include assigning the specific application to an application-specific migration metadata model (310). The migration architecture 112 adds, into the application-specific metadata model, application database identification metadata and application database location metadata characterizing the application database (312).

The migration architecture 112 initiates migration of the specific application. The tasks carried out by the migration architecture 112 may include requesting deployment of a target environment for the specific application (312), for instance. In terms of providing a complete migration, the migration architecture 112 identifies the application data sets required for execution of the specific application (314). Having done so, the migration architecture 112 may then control migration of the application database into the target environment (316) as well as control migration of the specific application code or executable into the target environment (318). That is, the migration architecture 112 migrates the complete application and data bundle 270 from a current environment to a target environment.

FIGS. 4-28 illustrate one implementation of the application migration interface 276. FIG. 4 shows an application dashboard 400 that provides a management interface for any number of applications. In this example, the dashboard 400 provides application visualizations 402, 404, and 406 for an Enrollment Application, Demo Application, and Payroll Application, respectively. For the purposes of explanation, the discussion below concerns migration of the Demo Application to a new target environment.

Figure 5:
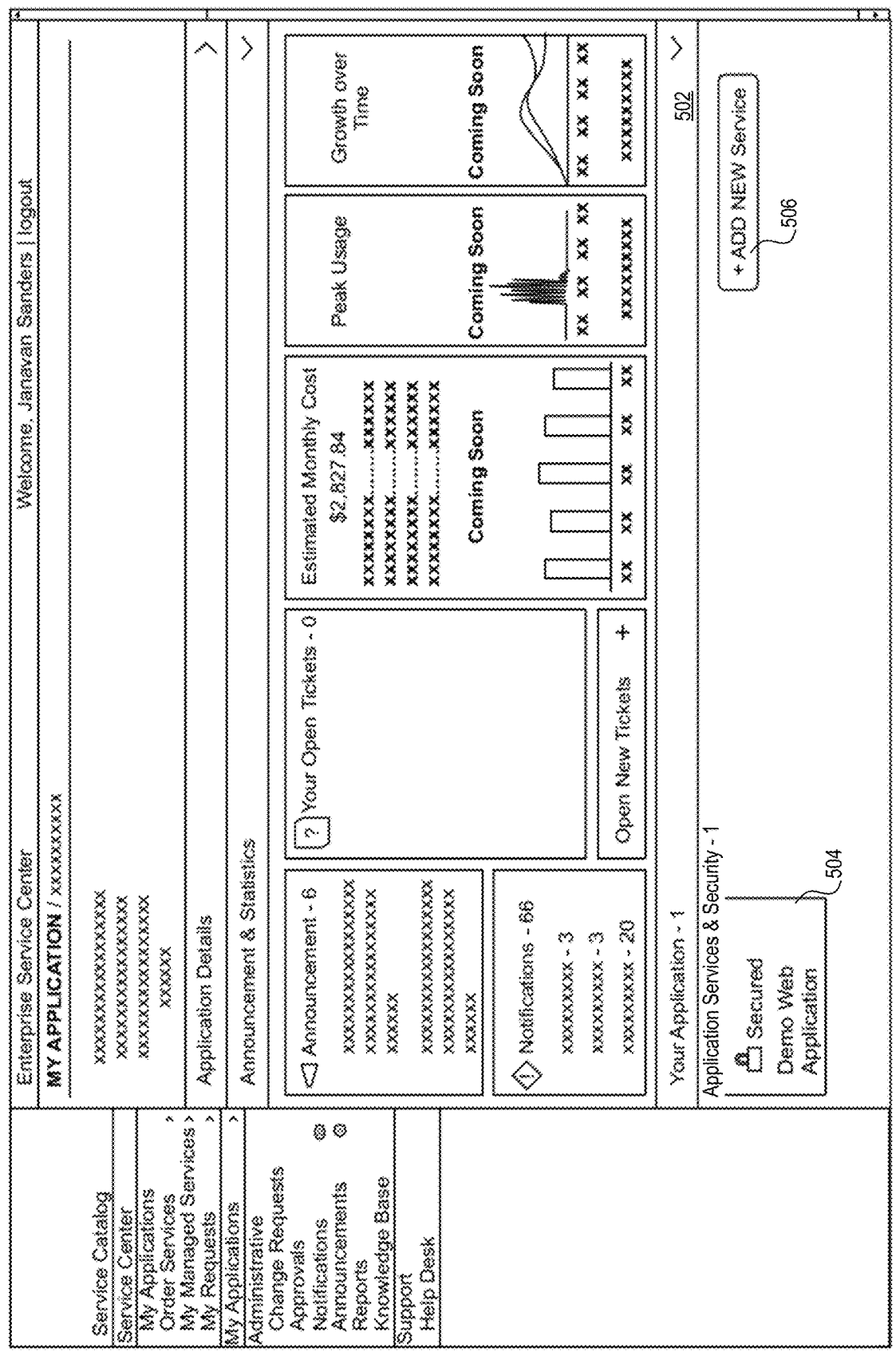

FIG. 5 shows a view 500 of the dashboard with the application services panel 502 opened for the Demo Application. The application services panel 502 provides an interface through which the operator may register services for an application (e.g., .net and Java services) as well as Web services and Web applications that together compose the application. In this example, the Demo Application is registered as having the Demo Web Application component 504, and additional services may be registered via the Add Service control 506.

Figure 6:
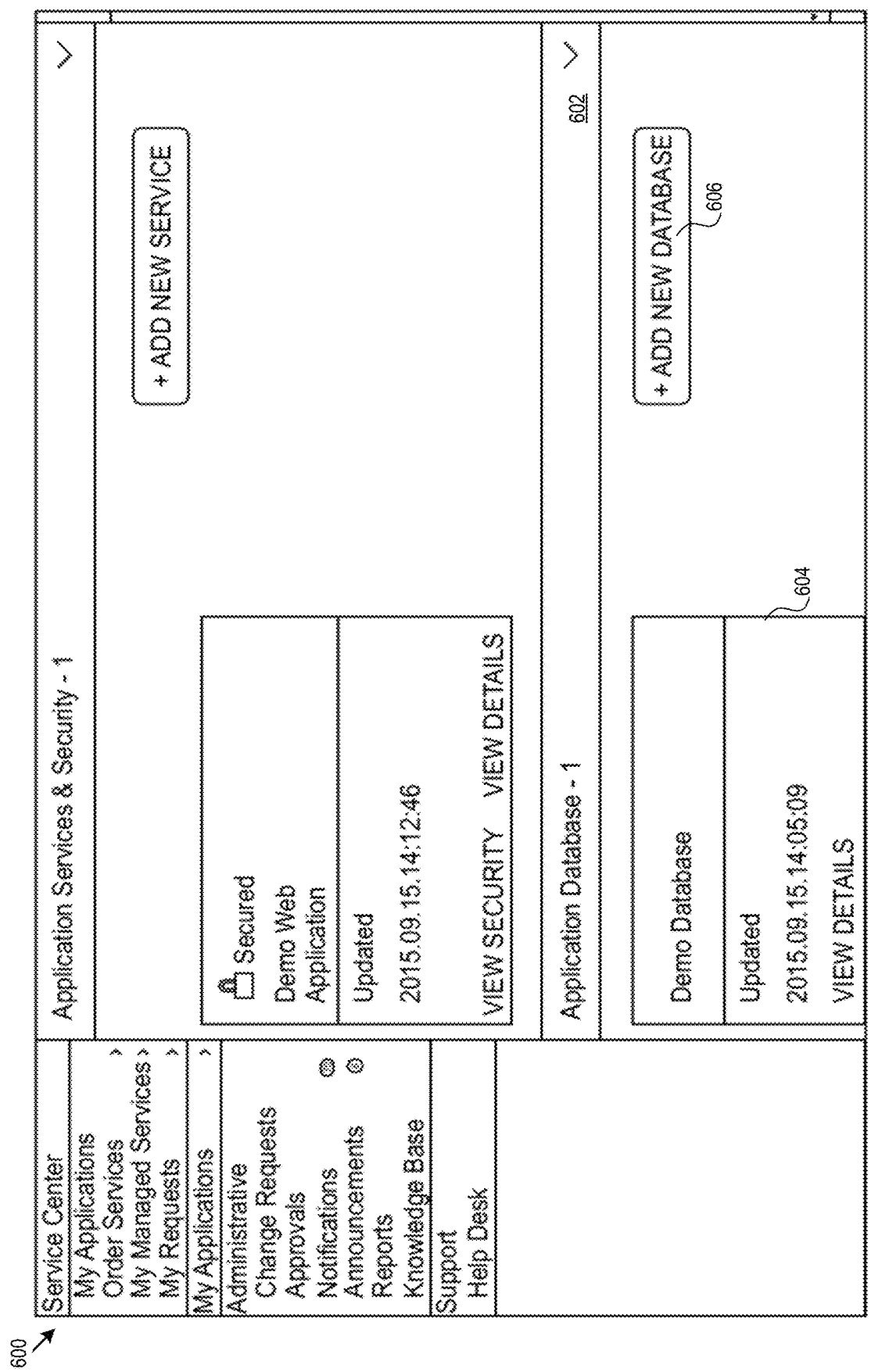

FIG. 6 shows a view 600 of the dashboard with the application databases panel 602 opened for the Demo Application. The application databases panel 602 provides an interface through which the operator may register databases used by an application. In this example, the Demo Application is registered as using the Demo Database 604, and additional databases (or any other type of data source) may be registered to the application via the Add Database control 606. This interface facilitates the identification of data sources to the application in question, in preparation for migrating the application and data bundle.

Figure 7:
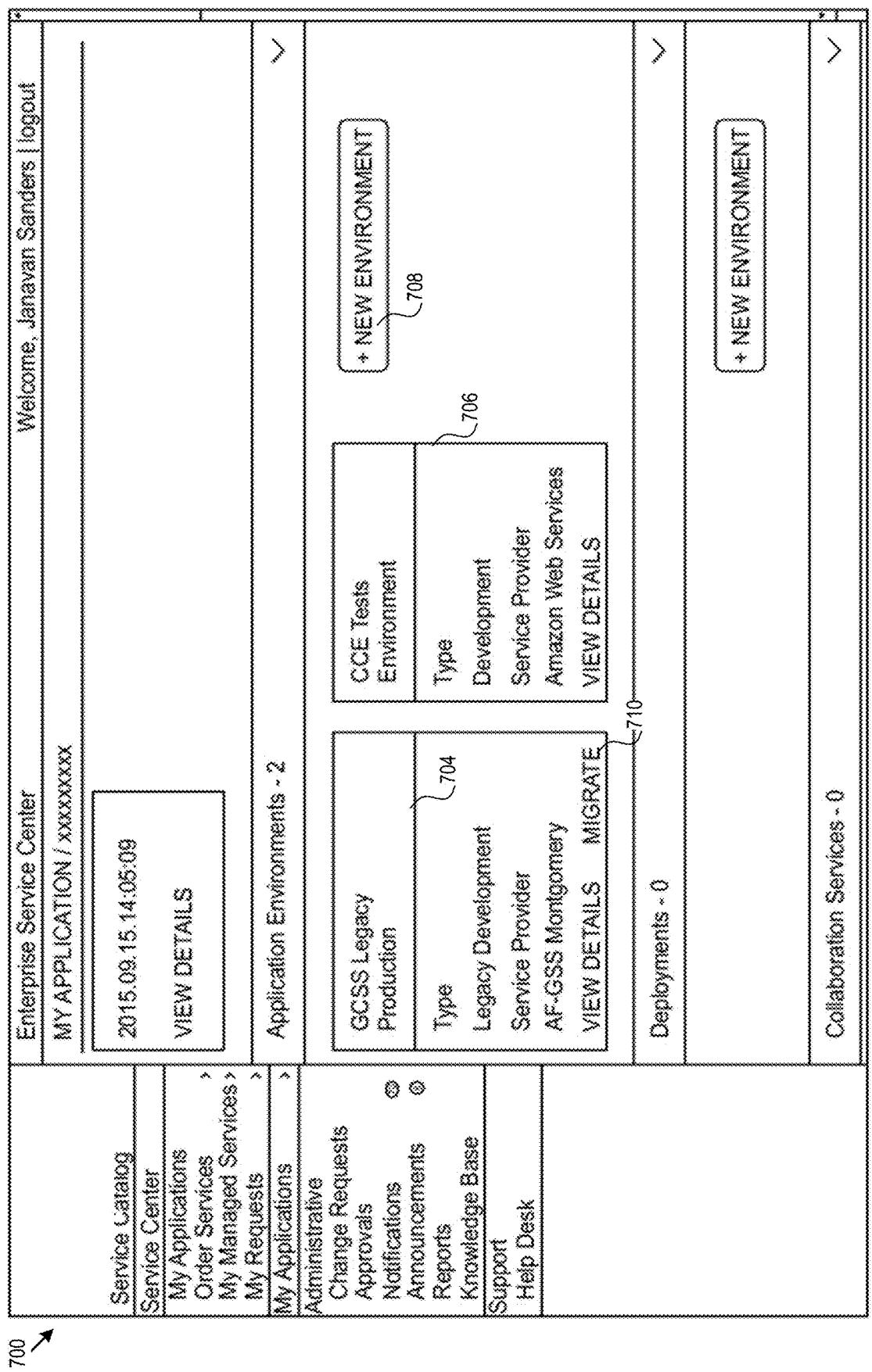

FIG. 7 shows a view 700 of the dashboard with the application environments panel 702 opened for the Demo Application. The application environments panel 702 provides an interface through which the operator may register specific application environments to the application in question. In this example, the Demo Application is registered to two environments, the legacy production environment 704 and the tests environment 706. The environments capture the technical characteristics of where the application is currently hosted (as examples, number of processors, RAM, disk space, database versions, network connectivity), or where the application may be hosted.

In the example in FIG. 7, the Demo Application is hosted in the legacy development environment 704, and will migrate to the tests environment 706 which is hosted with a different service provider. The Add Environment control 708 provides the capability for the operator to define, specify, and add a new environment associated to the application in question. For instance, the operator has defined and added the test environment 706 to provide a migration destination for the Demo Application, which is currently hosted in the legacy development environment 704. A migration GUI element 710 is active in the interface and initiates the migration as noted below with respect to the discussion starting with FIG. 14.

Figure 8:
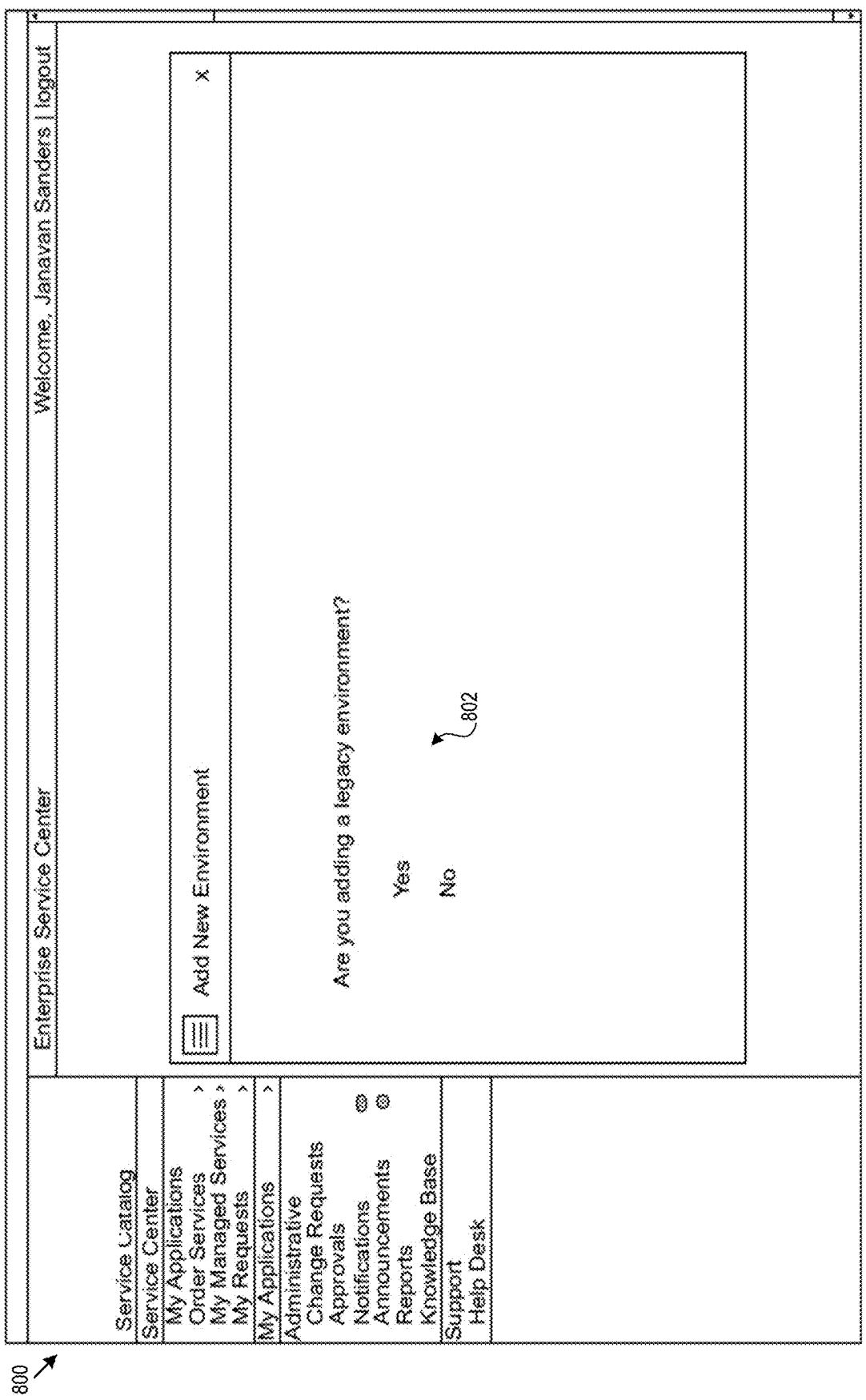
Figure 9:
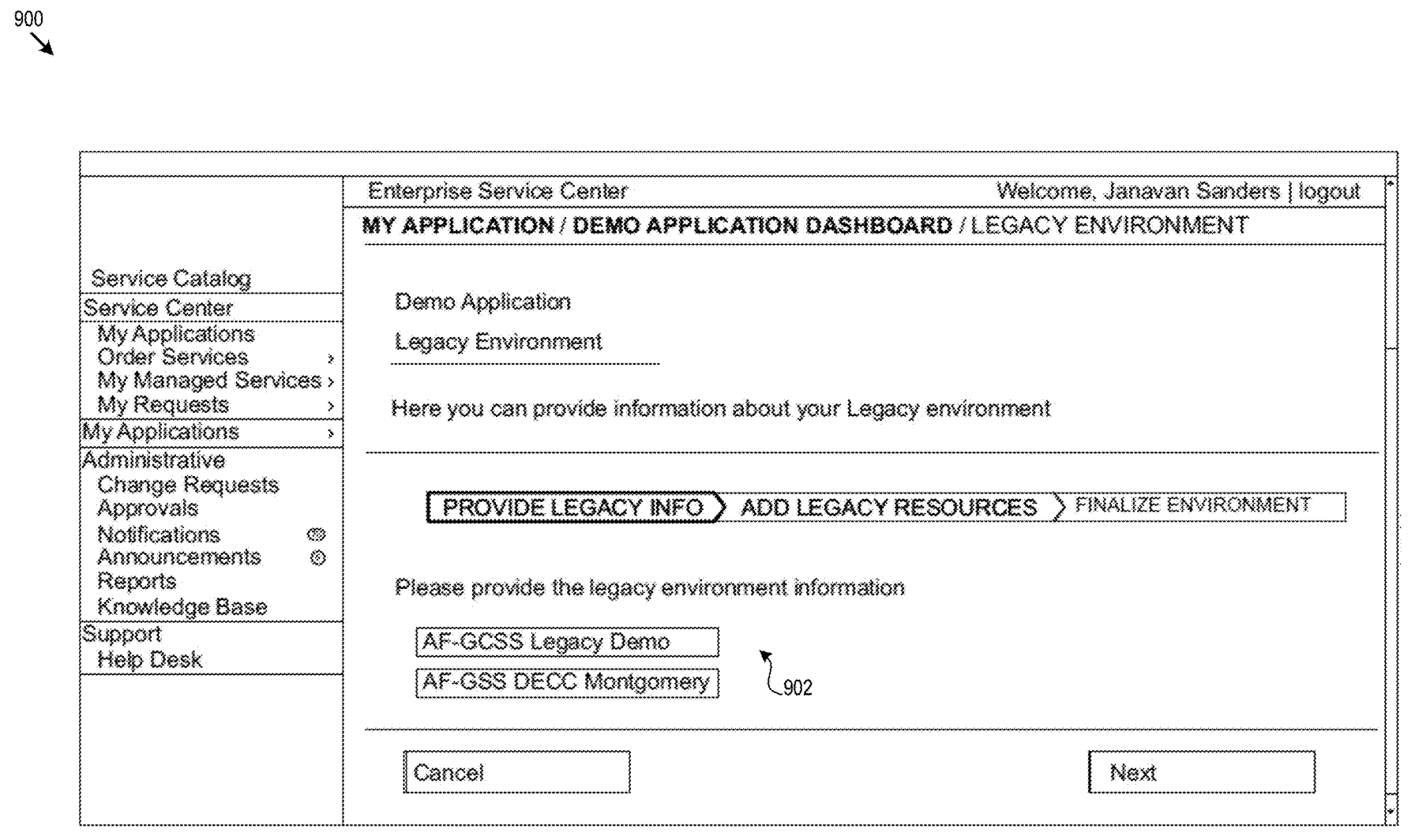
Figure 10:
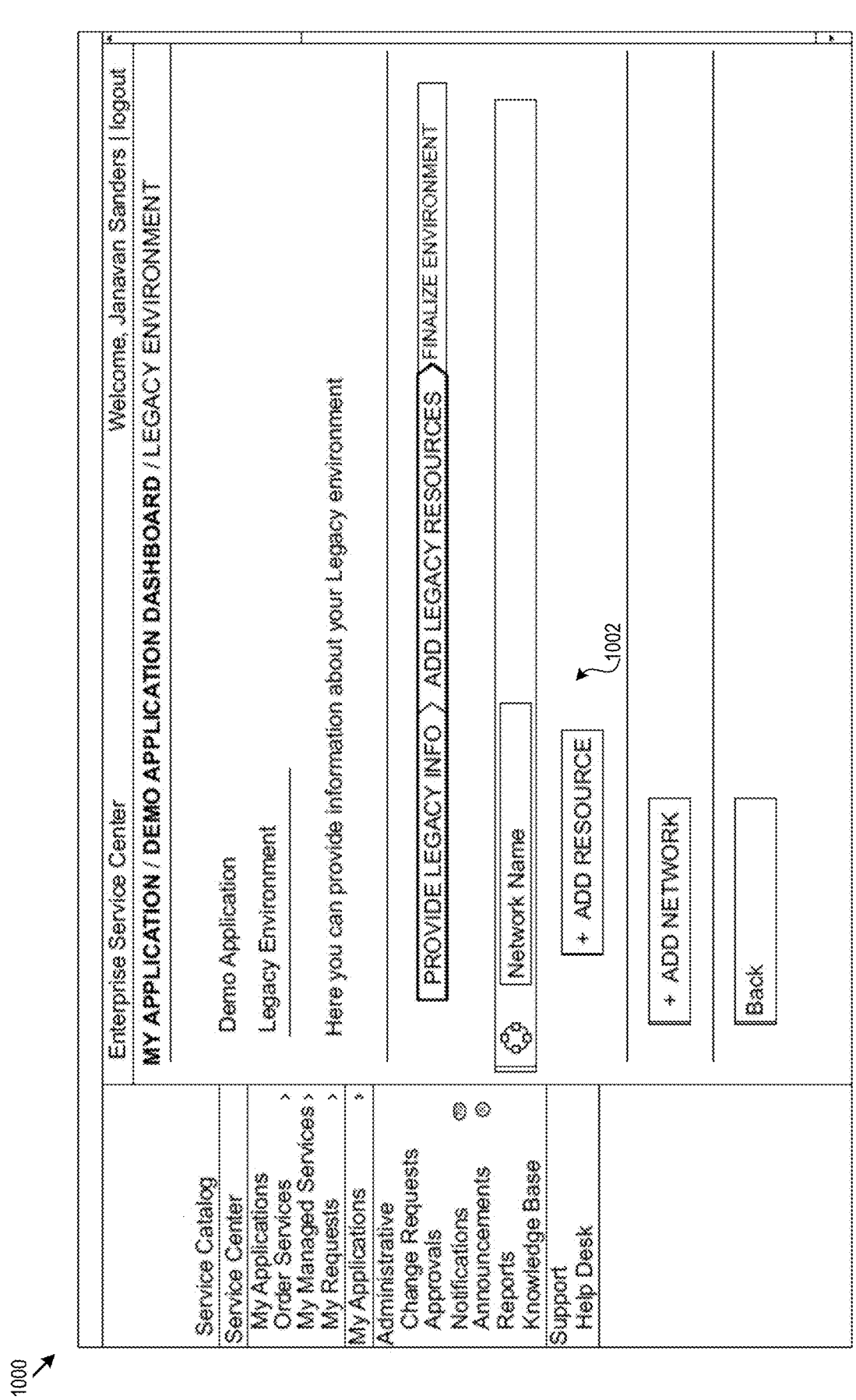

FIG. 8 shows an interface 800 for adding an environment, responsive to the Add Environment control 708. The interface 800 allows the operator to specifically designate whether any environment is a legacy environment via the environment type dialog 802. FIG. 9 shows a legacy environment information interface 900. The information dialog 902 permits the operator to specify an environment name and location. FIG. 10 shows a legacy environment resources interface 1000. The resource dialog 1002 permits the operator to specify technical resources for the legacy environment. That is, the interface 1000 permits entry of the resources that the Demo Application consumes in the legacy environment in which it is currently hosted. In the example of FIG. 10, the interface 1000 includes a network data interface 1002 that facilitates entry of the network connectivity for the Demo Application.

Figure 11:
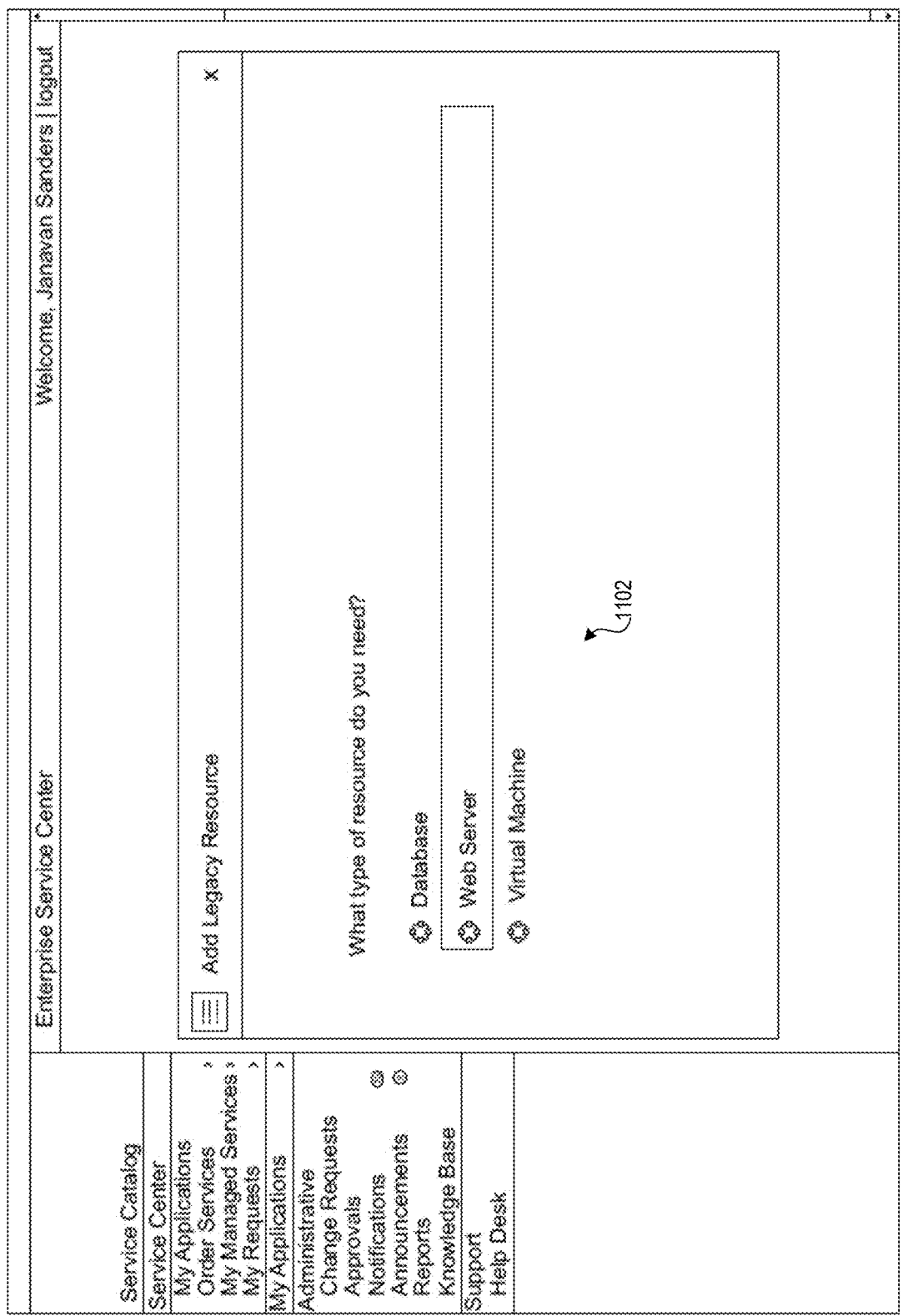

FIG. 11 shows an additional legacy environment resources interface 1100. The interface 1100 allows the operator to specify additional resources for the Demo Application. In particular, the interface 1100 implements a selection interface 1102 between databases, web servers, application tiers, and virtual machine used by the Demo Application.

Figure 12:
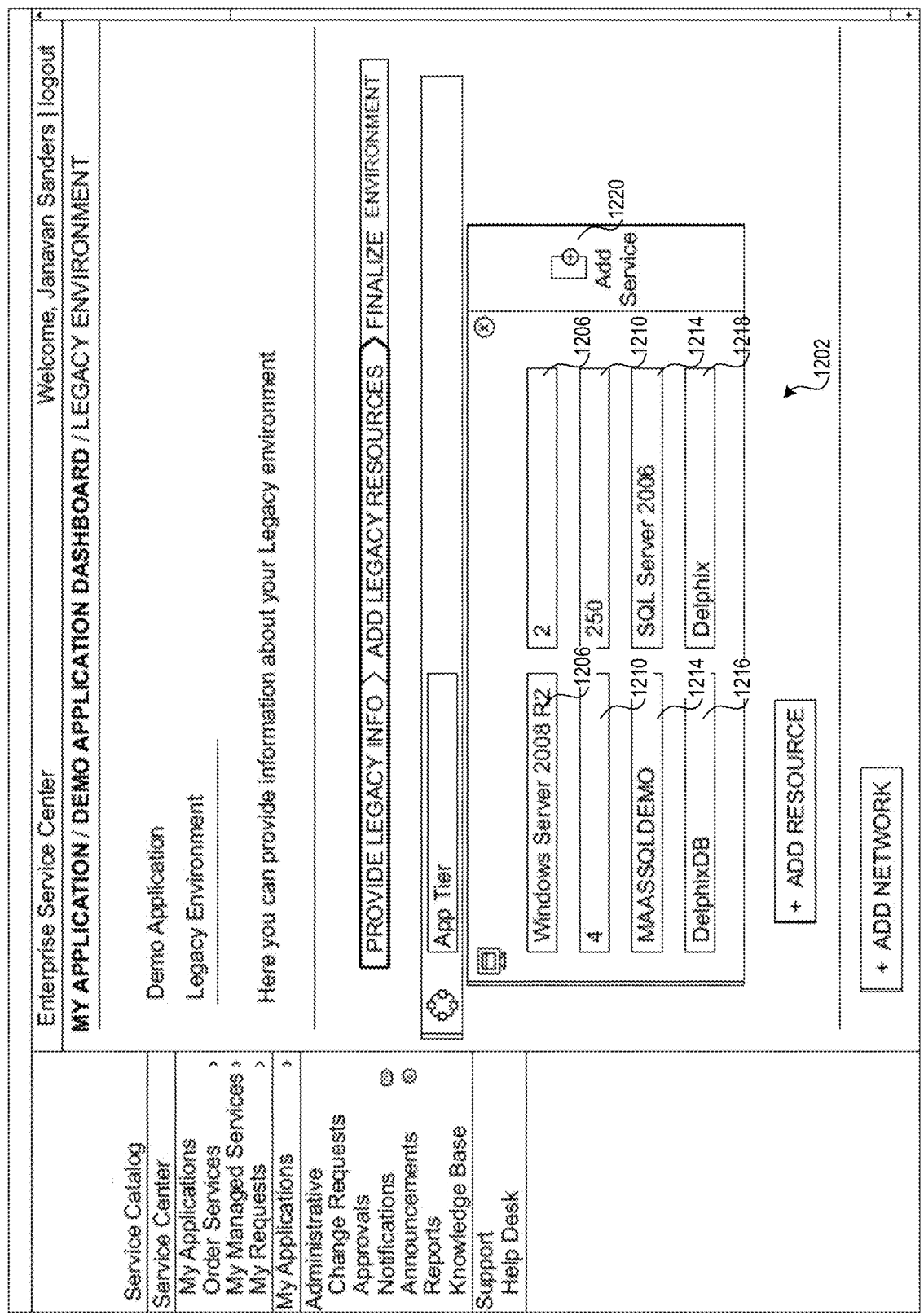
Figure 13:
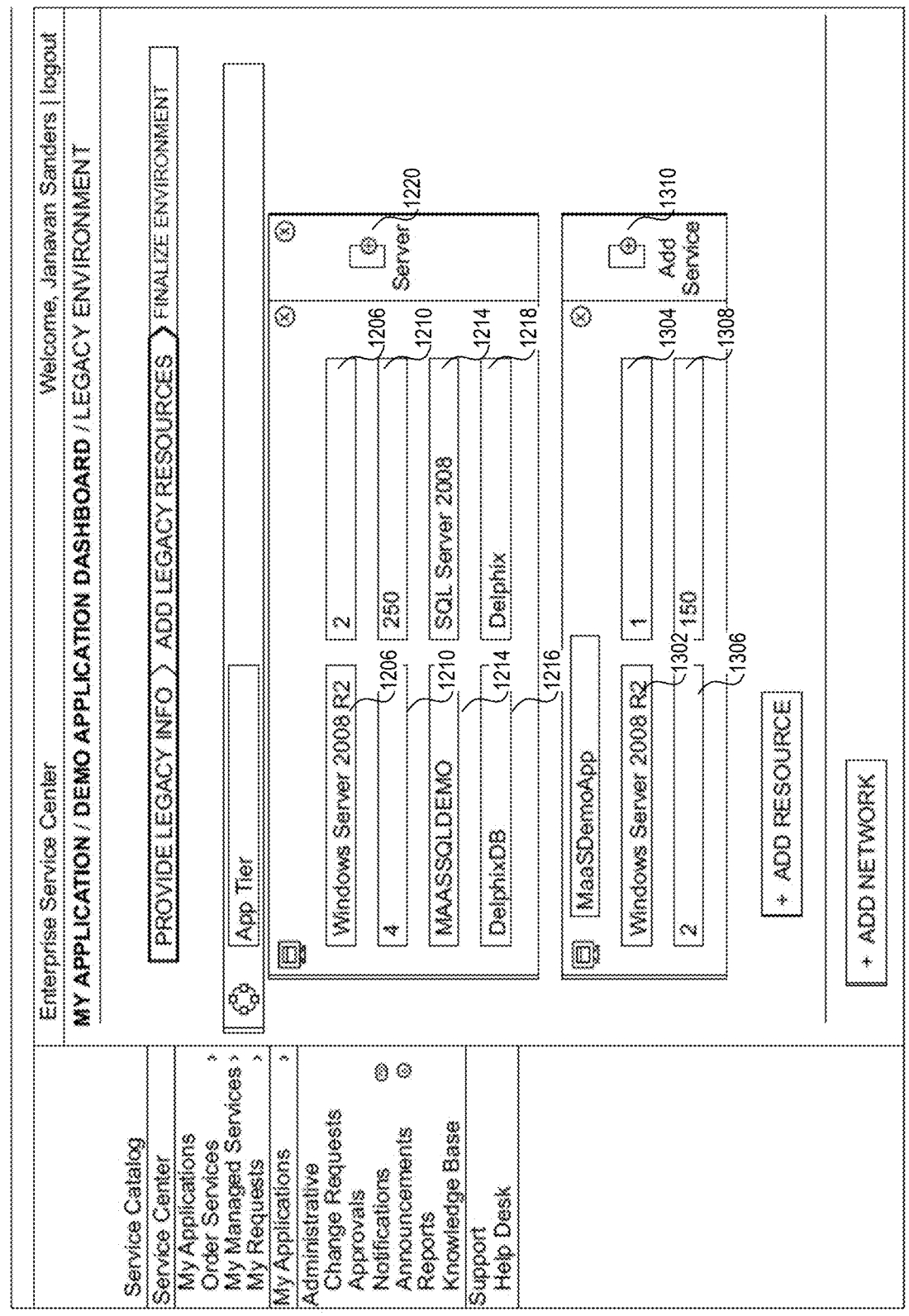

FIG. 12 shows an interface 1200 for adding an application tier. In this instance, the tier interface panel 1202 defines technical characteristics for a database tier. The technical characteristics include the operating system version 1204, number of processors 1206, amount of RAM 1208, and amount of disk space 1210. The technical characteristics further include the database name 1212, SQL server version 1214, and virtualized database name 1216 and database virtualization vendor 1218. The add-association GUI element 1220 causes the system to associate the database tier to the Demo Application registered in via the dashboard. FIG. 13 shows an interface 1300 for adding another VM to the Demo Application, including specification of the operating system 1302, number of processors 1304, amount of RAM 1306, and disk space 1308. The add-association GUI element 1310 causes the architecture 112 to associate the VM to the Demo Application registered in via the dashboard.

Figure 15:
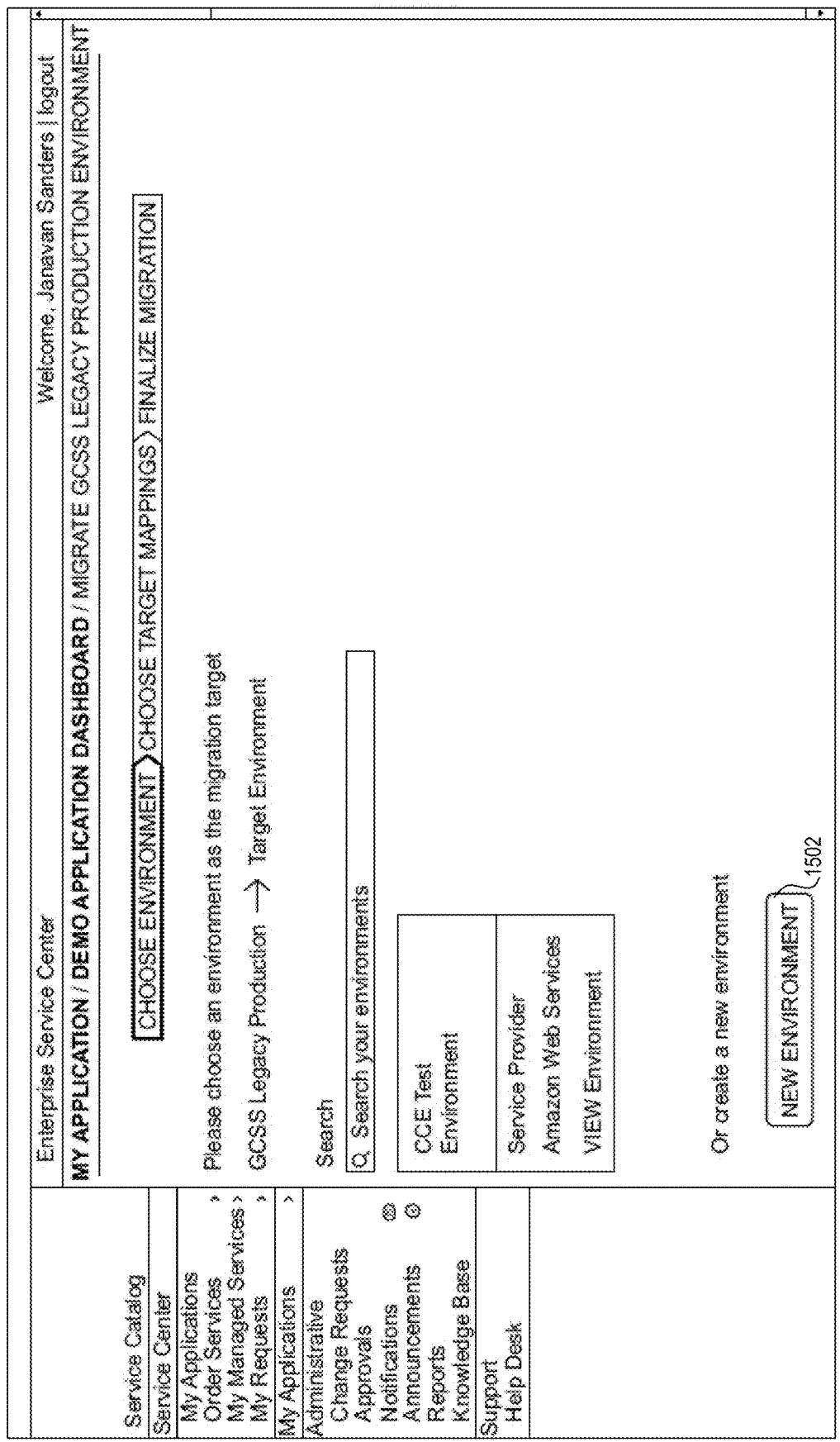

FIG. 14 shows an example of a migration interface 1400. The system executes migration processing when, for instance, the operator activates the migration GUI element 710. The migration interface 1400 provides a target environment search option and a target environment selection panel 1402. FIG. 15 shows that the migration interface 1400 may include a GUI element 1502 for defining a new target environment.

Figure 16:
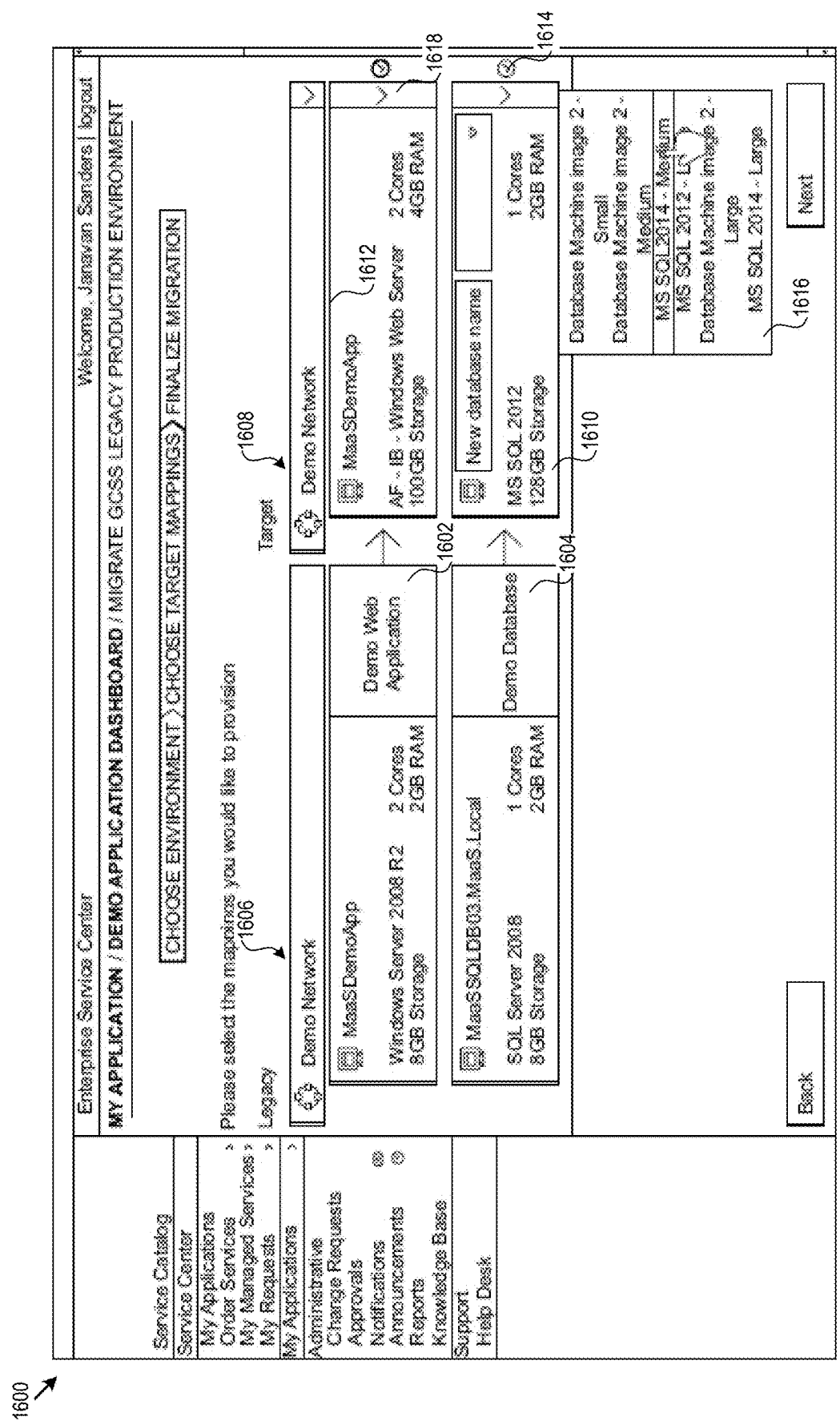

FIG. 16 shows an example of a target mappings interface 1600. FIG. 16 illustrates that the Demo Application includes a Demo Web Application 1602 that requires a Demo Database 1604. The legacy resources panel 1606 shows the legacy resources used by the Demo Application, e.g., a Windows Server 2008 instance and an SQL server instance. The mappings panel 1608 shows the suggested mappings into the target environment selected by the architecture 112.

In that regard, the architecture 112 may analyze and follow any predefined mappings, e.g., in a pre-defined service catalog 242. In this example, the service catalog 242 maps the SQL server 2008 instance for the Demo Database 1604 to an MS SQL 2014 instance 1610 with one core, 2 GB RAM, and 100 GB of disk space that is available in the target environment. Similarly, the service catalog 242 maps the Windows Server 2008 R2 instance for the Demo Application to a Windows Web Server instance 1612 with 2 processor cores, 100 GB disk space and 4 GB of RAM. The interface 1600 provides accept-mapping selectors, e.g., the selector 1614, to allow the operator to approve of any given mapping.

The interface 1600 generates alternate mappings available within the target environment, and displays the alternate mappings responsive to selection drop-down GUI elements. The alternate server mapping 1616, for instance, presents a list of alternate server instance selections responsive to the server selection drop-down element 1618. Through this mechanism, the operator may select alternate mappings into the target environment for any given component of the Demo Application.

Figure 17:
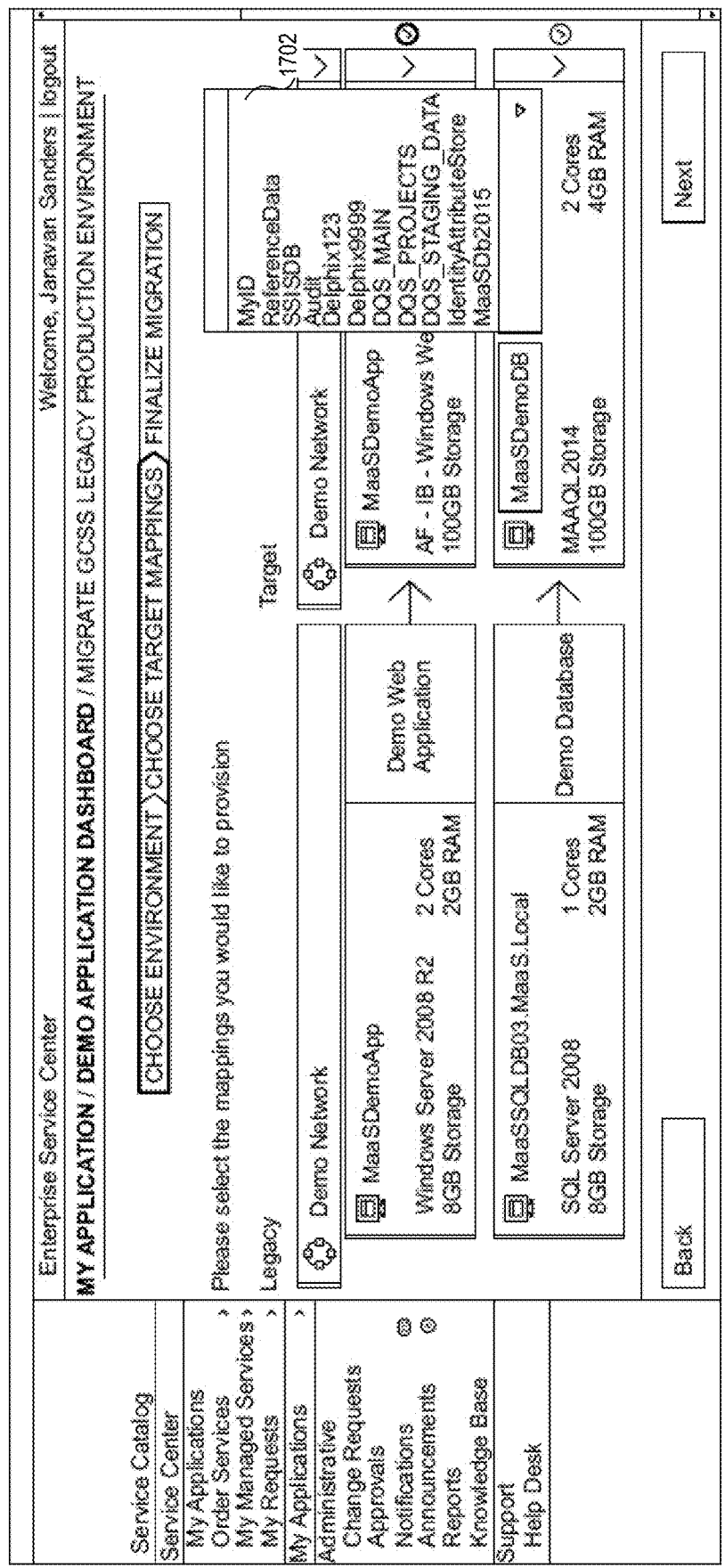

In connection with migration, FIG. 17 shows a database migration interface 1700. The interface 1700 accepts an operator selection of the database instance that was on the legacy server to migrate. In that regard, the interface 1700 displays a selection list 1702 populated with the databases present in the legacy environment. The architecture 112 may discover the databases using, for instance, an automated discovery process. In this example, the operator may select the MaaSDB2015 database to migrate, because it was used by the Demo Database 1604.

Figure 18:

FIG. 18 shows a migration summary interface 1800. The summary interface 1800 may show each resource to be provisioned into the target environment, the services those resources are associated with, and provide a name entry element to name the deployment. In this example, the resources include the Windows Web Server 1802 and the SQL 2014 instance 1804. That is, the resources 1802, 1804 will instantiate in the target environment to support the migration of the Demo Application and Demo Database from the legacy environment.

FIG. 19 shows a migration status interface 1900 that may be shown in an enterprise service center GUI. The interface 1900 may display ongoing status in a pending items panel 1902. In this example, the pending items panel 1902 indicates that provisioning of both the web server and SQL instance are pending. The change request indicator 1904 allows the operator to review and request changes to any pending item.

Figure 20:
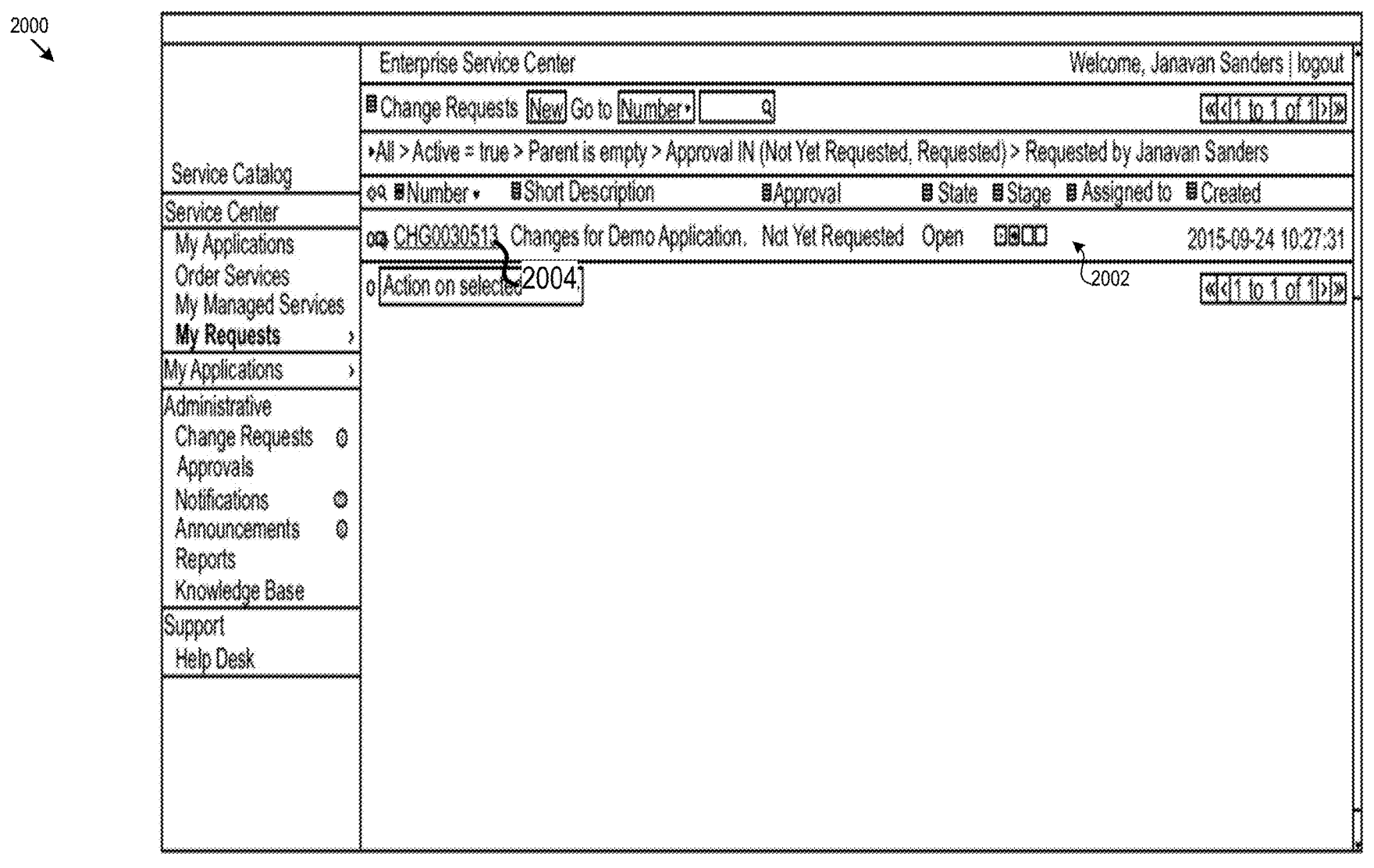
Figure 21:
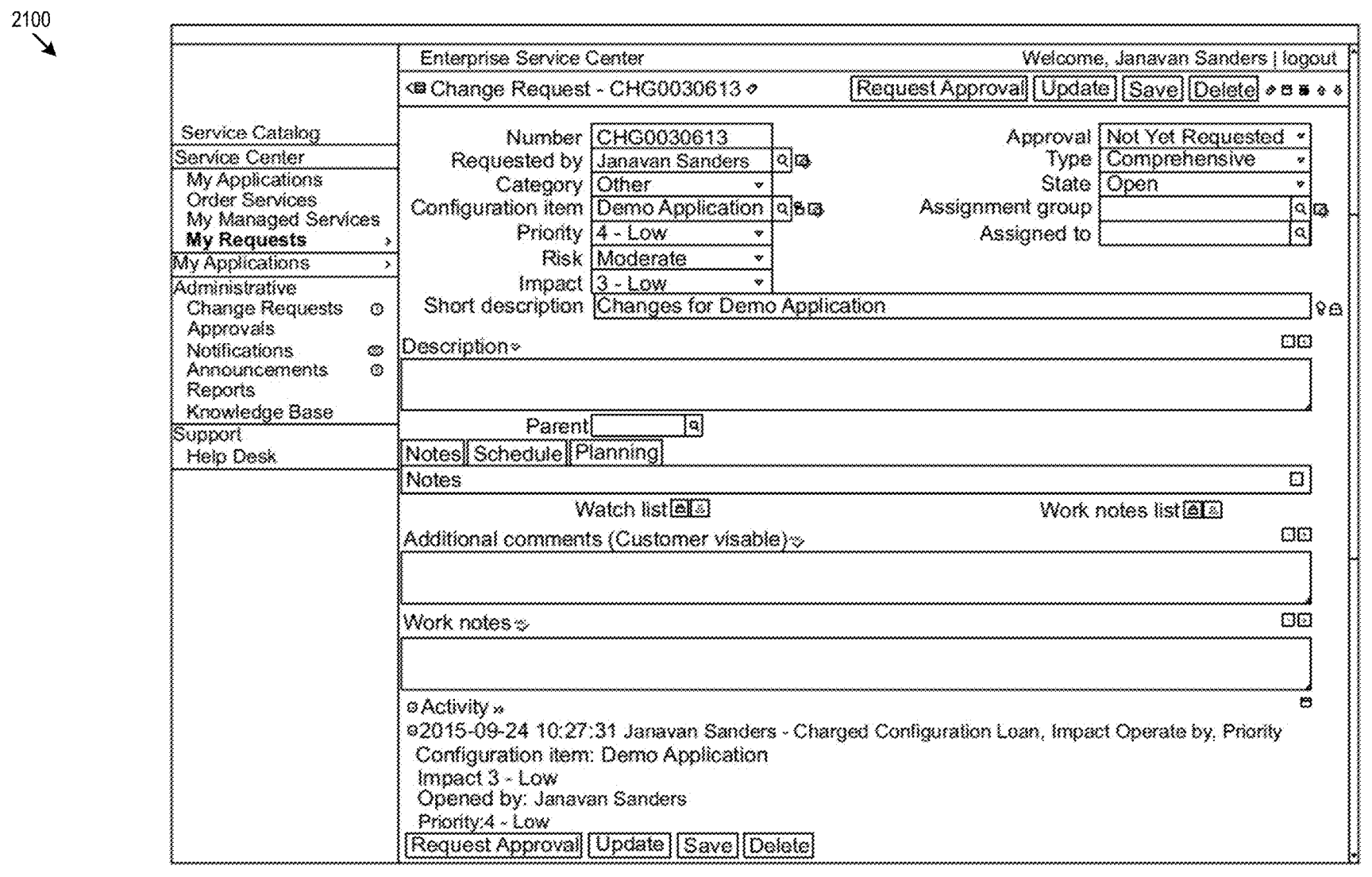

FIG. 20 shows an example change request interface 2000. The interface 2000 displays a summary 2002 of pending change requests, e.g., a change request 2004 entered for the Demo Application. FIG. 21 shows an example interface for providing a detailed view 2100 of the change request 2004. The detailed view 2100 allows the operator to set change characteristics, such as requestor name, priority, risk level, impact level, description, configuration item, category, type, state, approval status, assigned group and person, and other change characteristics.

Figure 22:
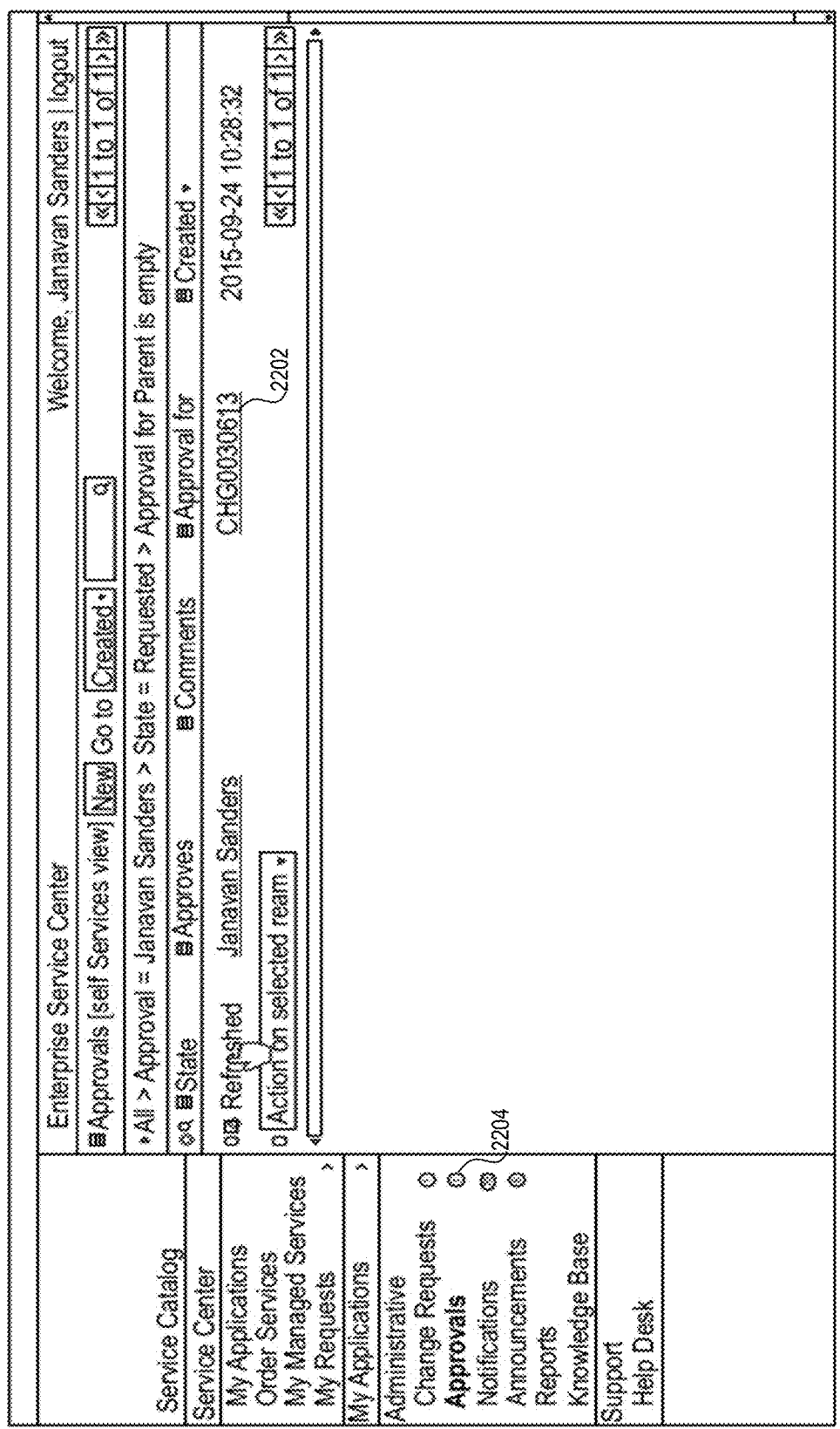

FIG. 22 shows an approval interface 2200. The approval interface 2200 notes which change requests are pending, e.g., the request 2202. The approval interface 2200 also provides an approval indicator 2204 allows the operator to review and approve pending items.

Figure 24:
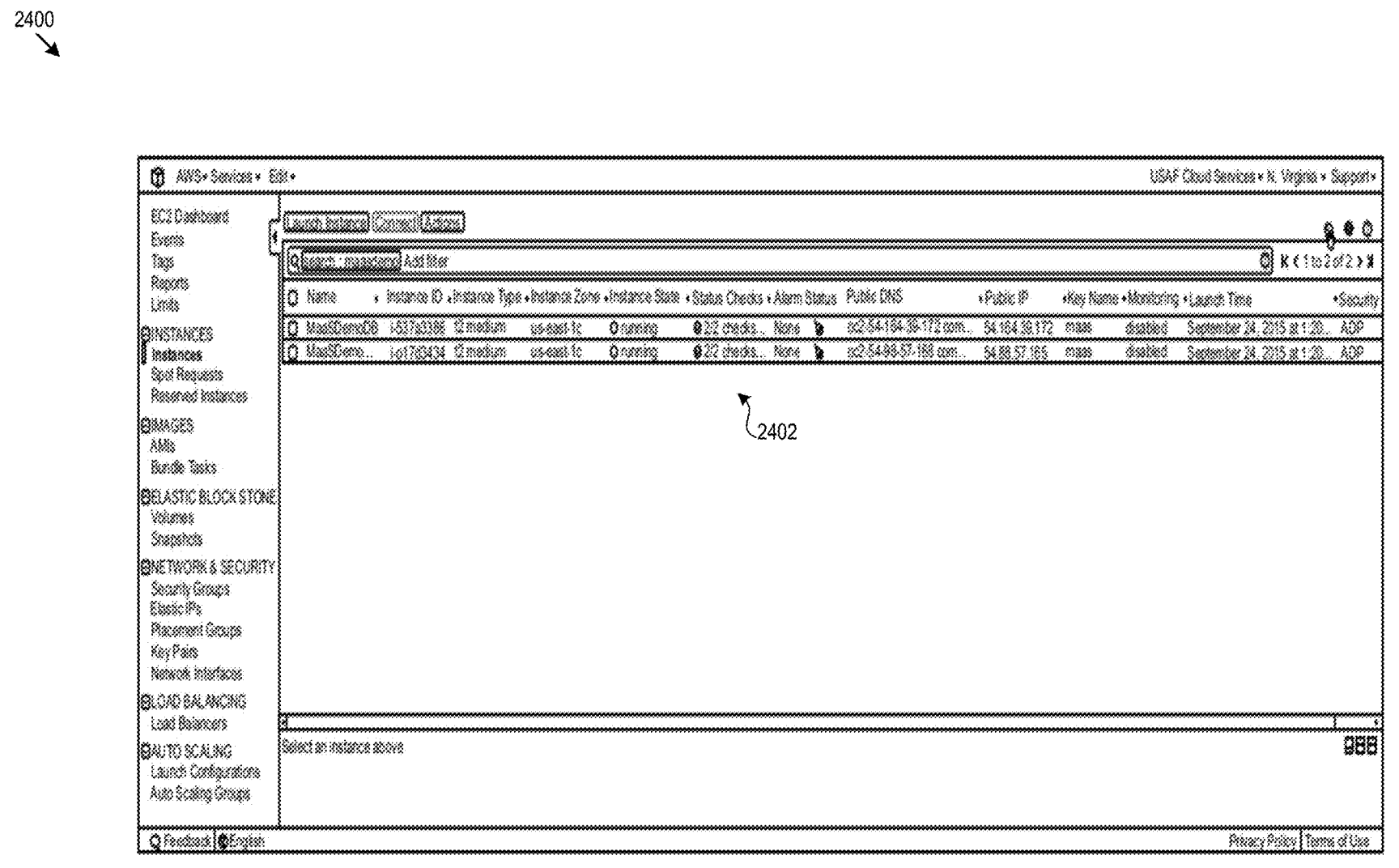

FIG. 23 shows that the application migration interface 276, e.g., in the application dashboard 400, updates to show a view 2300 of the ongoing provisioning in the pending networks panel 2302. The architecture 112 handles the provisioning by, for instances, executing an orchestration engine to send provisioning messages to the target environment host. FIG. 24 shows an example host console 2400. The host console 2400 is generated by the target environment host. In this example, the host console 2400 confirms in the summary section 2402 that the host is working on instantiation of the MS SQL 2014 instance 1610 and the Windows Web Server instance 1612.

Figure 25:
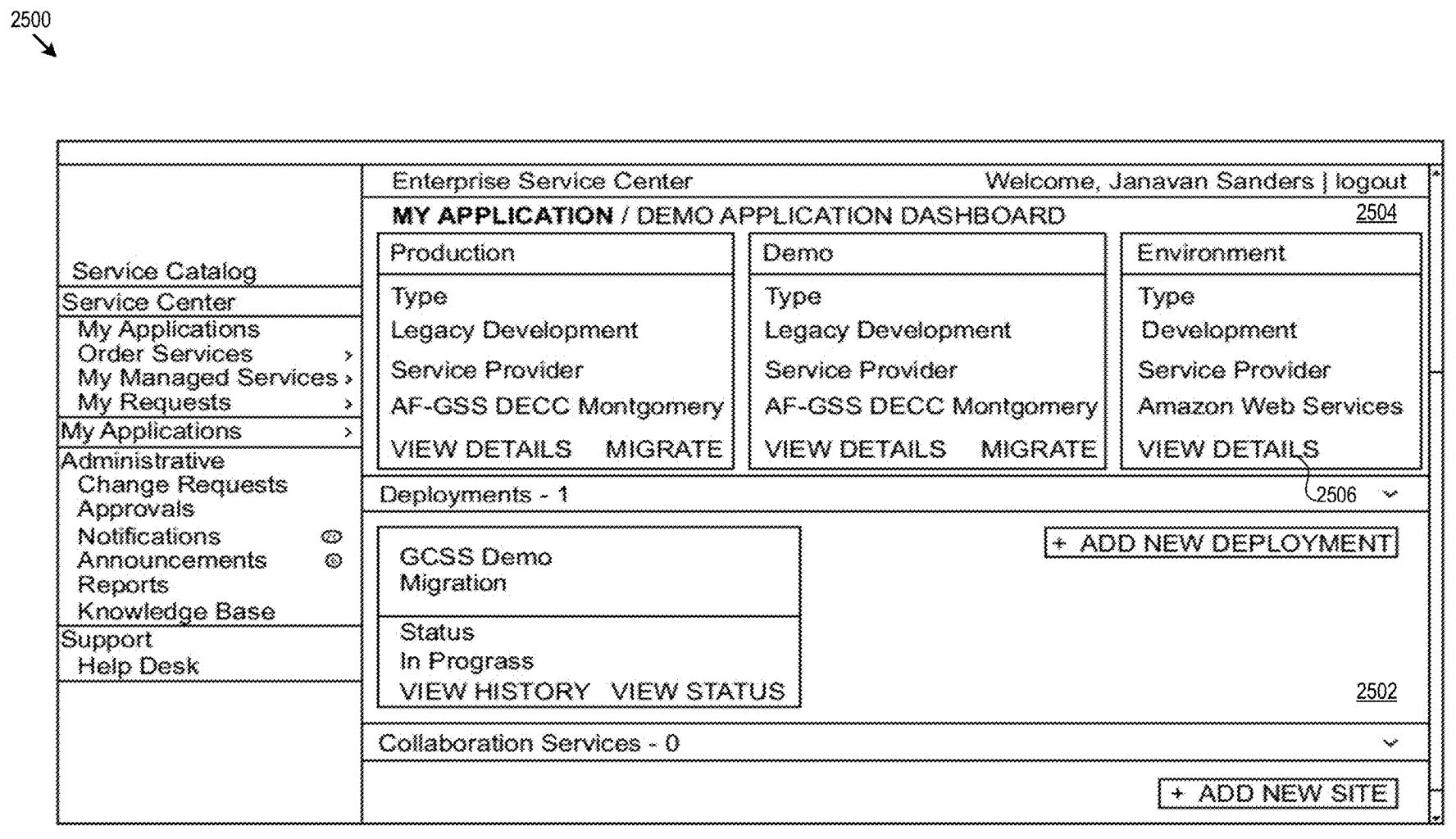
Figure 26:
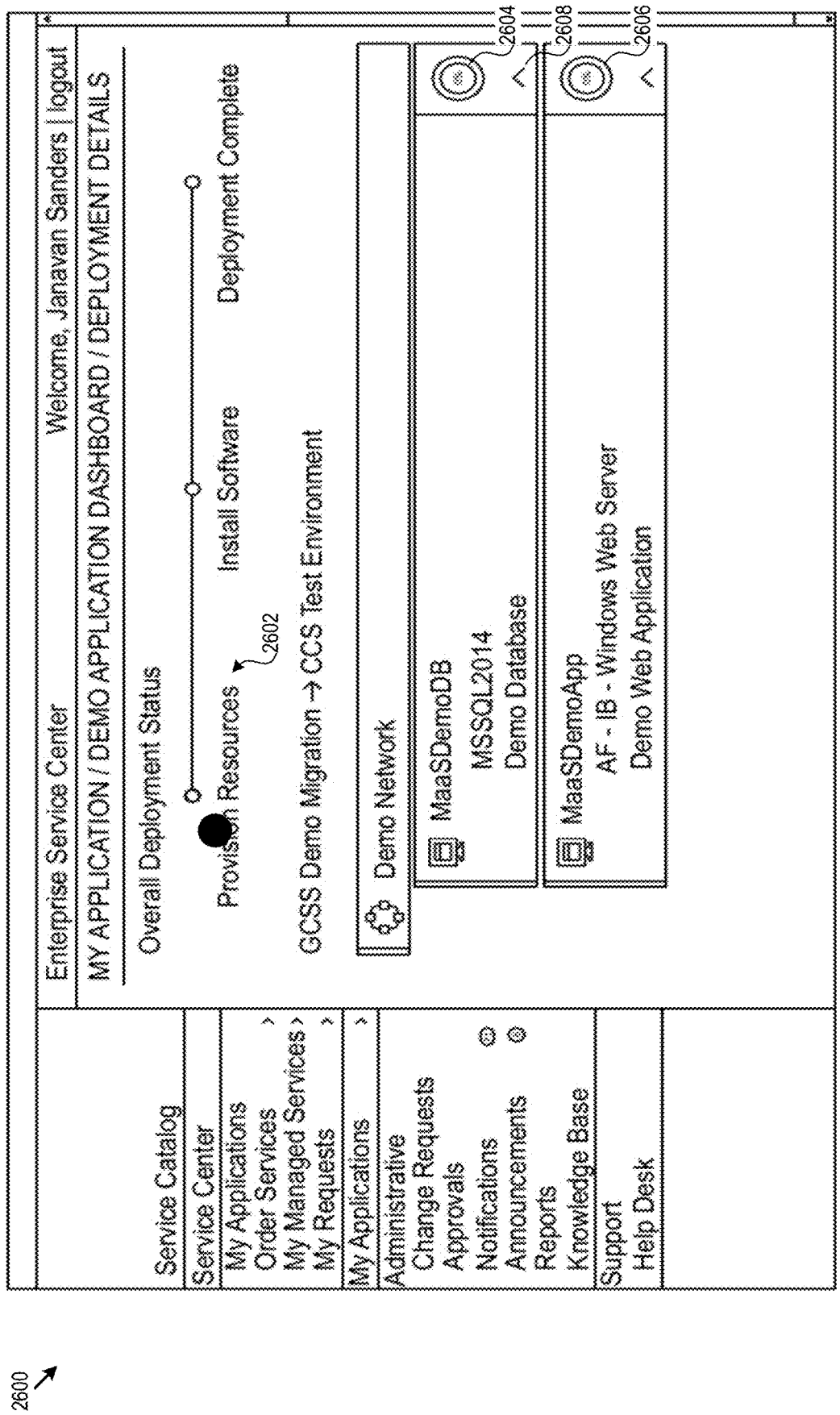

Similar to FIG. 23, FIG. 25 shows that the application migration interface 276, e.g., in the application dashboard 400, updates to show a view 2500 of the ongoing provisioning in the pending deployments panel 2502 and in the application status panel 2504. A details interface element 2506 allows the operator to view, as shown in FIG. 26, a details interface 2600. The details interface 2600 indicates overall deployment status 2602 (currently at provisioning in this example), deployment status for each resource, e.g., the demo database status 2604 and the web application status 2606. The details interface 2600 also provides individual resource detail status elements, for instance the status element 2608 for the demo database.

Figure 27:
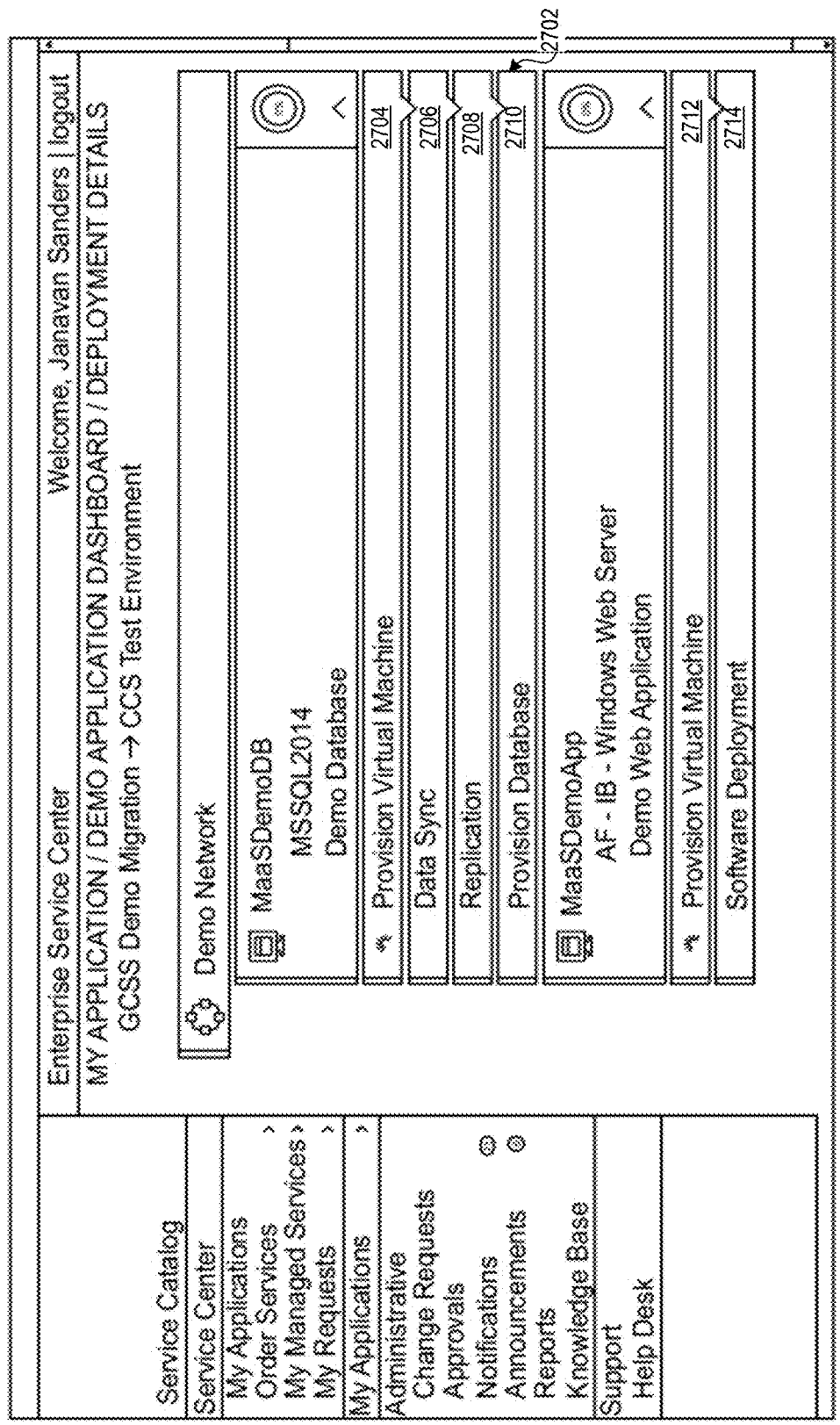
Figure 28:
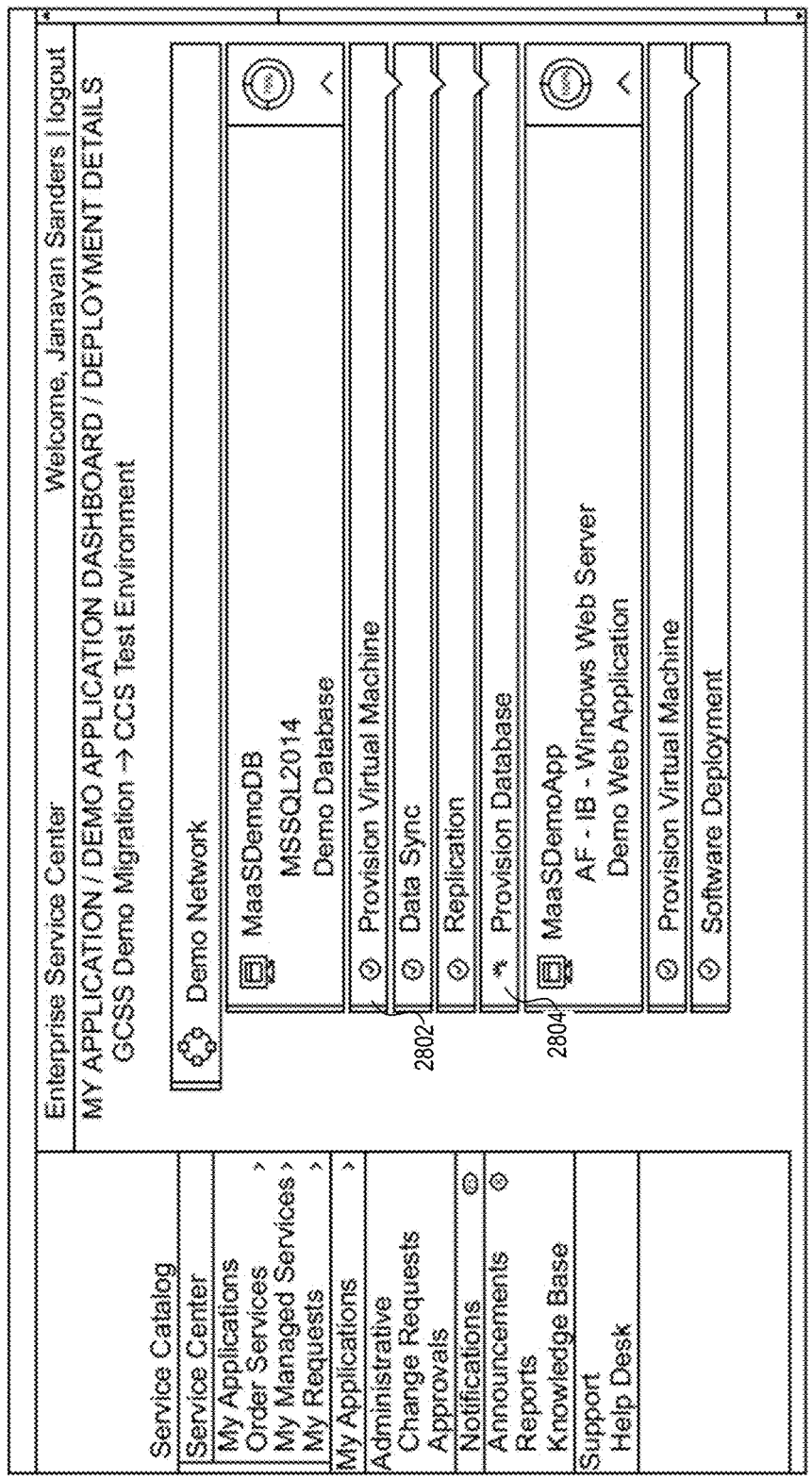

FIG. 27 shows an example of the individual resource detail status interface 2700. In particular, the interface 2700 provides detail status entries 2702. The detail status entries 2702 may be presented as a sequential set of actions to be completed, and their individual status. For instance, for the demo database, the sequential set of actions includes Provisioning a virtual machine 2704, Data sync 2706, Data replication 2708, and Database provisioning 2710. For the web application, the sequential set of actions includes Provisioning a virtual machine 2712 and Software deployment 2714. In the example of FIG. 27, the detailed status shows that each set of actions has just started. FIG. 28 shows another view 2800 of the interface 2700 in which the set of actions has progressed, with completion indicators shown (e.g., the completion indicator 2802) and in-progress indicators (e.g., the in-progress indicator 2804).

The methods, devices, processing, circuitry, and logic described above may be implemented in many different ways and in many different combinations of hardware and software. For example, all or parts of the implementations may be circuitry that includes an instruction processor, such as a Central Processing Unit (CPU), microcontroller, or a microprocessor; or as an Application Specific Integrated Circuit (ASIC), Programmable Logic Device (PLD), or Field Programmable Gate Array (FPGA); or as circuitry that includes discrete logic or other circuit components, including analog circuit components, digital circuit components or both; or any combination thereof. The circuitry may include discrete interconnected hardware components or may be combined on a single integrated circuit die, distributed among multiple integrated circuit dies, or implemented in a Multiple Chip Module (MCM) of multiple integrated circuit dies in a common package, as examples.

Accordingly, the circuitry may store or access instructions for execution, or may implement its functionality in hardware alone. The instructions may be stored in a tangible storage medium that is other than a transitory signal, such as a flash memory, a Random Access Memory (RAM), a Read Only Memory (ROM), an Erasable Programmable Read Only Memory (EPROM); or on a magnetic or optical disc, such as a Compact Disc Read Only Memory (CDROM), Hard Disk Drive (HDD), or other magnetic or optical disk; or in or on another machine-readable medium. A product, such as a computer program product, may include a storage medium and instructions stored in or on the medium, and the instructions when executed by the circuitry in a device may cause the device to implement any of the processing described above or illustrated in the drawings.

The implementations may be distributed. For instance, the circuitry may include multiple distinct system components, such as multiple processors and memories, and may span multiple distributed processing systems. Parameters, databases, and other data structures may be separately stored and managed, may be incorporated into a single memory or database, may be logically and physically organized in many different ways, and may be implemented in many different ways. Example implementations include linked lists, program variables, hash tables, arrays, records (e.g., database records), objects, and implicit storage mechanisms. Instructions may form parts (e.g., subroutines or other code sections) of a single program, may form multiple separate programs, may be distributed across multiple memories and processors, and may be implemented in many different ways. Example implementations include stand-alone programs, and as part of a library, such as a shared library like a Dynamic Link Library (DLL). The library, for example, may contain shared data and one or more shared programs that include instructions that perform any of the processing described above or illustrated in the drawings, when executed by the circuitry.

Various implementations have been specifically described. However, many other implementations are also possible.

What is claimed is:

1. A method comprising:
defining an application service center interface;
delivering the application service center interface through a communication interface to an application owner;
registering a specific application through the application service center interface, including:
  responsive to operator input at the application service center interface, identifying an application database required for execution of the specific application, the operator input including a request to register the application database for the specific application;
  identifying a source environment in which the specific application currently runs;
  assigning the specific application to an application-specific metadata model;
  adding, into the application-specific metadata model, application database identification metadata and application database location metadata characterizing the application database; and
  adding, into the application-specific metadata model, source environment metadata that characterizes the source environment in which the specific application currently runs; and
initiating migration of the specific application through the application service center interface, including:
  requesting deployment of a target environment for the specific application;
  recognizing that the application database is required for execution of the specific application; and
  controlling migration of the application database into the target environment; and
  controlling migration of the specific application into the target environment by:
    generating multiple different hardware mappings to the target environment for a hardware component accessible within the source environment; and
    providing individual ones of the multiple different hardware mappings to respective accept-mapping selectors within the application service center interface to facilitate an operator selection among the multiple different hardware mappings via an input device, each of the accept-mapping selectors detailing a different hardware configuration, each of the different hardware mappings including:
      a specific number of processor cores;
      a specific amount of disk space; and
      a specific amount of Random Access Memory (RAM);
    for each hardware component in the individual ones of the multiple different hardware mappings, providing a listing of alternate mappings for the hardware component for display at a time of selection of a graphical user interface (GUI) element within the application service center interface;
    providing a listing of pending items to a pending items panel in the application service center interface, the pending items including instances of hardware components for which provisioning is currently pending; and
    for each of the pending items, providing a change request indicator displayed separately from the listing, the change request indicator configured to open a detail view responsive to operator input, the detail view including an option to request a change to the respective pending item, the option to request the change including an option to request to change:
      a priority of the pending item;
      a requestor name for the pending item;
      a risk level for the pending item;
      an impact level for the pending item;
      a configuration item for the pending item;
      a category for the pending item;
      a state for the pending item;
      an assigned group for the pending item;
      an authorization approval of the pending item; and
      a description of the pending item.

2. The method of claim 1, further comprising:
receiving, through the application service center interface, an identification of the target environment.

3. The method of claim 1, further comprising:
executing mapping rules to determine the target environment from the source environment.

4. The method of claim 1, where:
the source environment is a first virtualized environment; and
the target environment is a second virtualized environment.

5. The method of claim 1, where:
the source environment is a non-virtualized environment; and
the target environment is a virtualized environment.

6. The method of claim 1, where:
controlling migration of the application database comprises issuing provisioning instructions for instantiating the application database in the target environment.

7. The method of claim 1, where:
controlling migration of the application database comprises issuing provisioning instructions for instantiating the application database into the target environment as a virtualized application database.

8. The method of claim 1, where:
controlling migration of the application database comprises identifying specific data fields in the application database as masked data fields; and
preventing data entries in the masked data fields from appearing in the application database in the target environment by clearing the masked entries during transfer to the target environment.

9. The method of claim 1, further comprising:
executing post-migration configuration on the specific application in the target environment.

10. The method of claim 9, where:
the executing comprises: reconfiguring the specific application to access the application database in the target environment.

11. A system comprising:
machine interface circuitry defining an application service center interface;
a communication interface circuitry configured to deliver the application service center interface to an application owner; and
application configuration circuitry configured to:
  register a specific application through the application service center interface by:
    responsive to operator input at the application service center interface, identifying an application database required for execution of the specific application, the operator input including a request to register the application database for the specific application;
    identifying a source environment in which the specific application currently runs;
    assigning the specific application to an application-specific metadata model;
    adding, into the application-specific metadata model, application database identification metadata and application database location metadata characterizing the application database; and
    adding, into the application-specific metadata model, source environment metadata that characterizes the source environment in which the specific application currently runs; and
  initiate migration of the specific application through the application service center interface by:
    requesting deployment of a target environment for the specific application;
    recognizing that the specific application relies on the application database during execution of the specific application; and
    controlling migration of the application database into the target environment; and
    controlling migration of the specific application into the target environment by:
      generating multiple different hardware mappings to the target environment for a hardware component accessible within the source environment;
      providing individual ones of the multiple different hardware mappings to respective accept-mapping selectors within the application service center interface to facilitate an operator selection among the multiple different hardware mappings via an input device, each of the accept-mapping selectors detailing a different hardware configuration, each of the different hardware mappings including:
        a specific number of processor cores;
        a specific amount of disk space; and
        a specific amount of Random Access Memory (RAM);
      for each hardware component in the individual ones of the multiple different hardware mappings, providing a listing of alternate mappings for the hardware component for display at a time of selection of a graphical user interface (GUI) element within the application service center interface;
      providing a listing of pending items to a pending items panel in the application service center interface, the pending items including instances of hardware components for which provisioning is currently pending; and
      for each of the pending items, providing a change request indicator displayed separately from the listing, the change request indicator configured to open a detail view responsive to operator input, the detail view including an option to request a change to the respective pending item, the option to request the change including an option to change:
        a priority of the pending item;
        a requestor name for the pending item;
        a risk level for the pending item;
        an impact level for the pending item;
        a configuration item for the pending item;
        a category for the pending item;
        a state for the pending item;
        an assigned group for the pending item;
        an authorization approval of the pending item; and
        a description of the pending item.

12. The system of claim 11, where:
the application-specific metadata model further comprises an identification of the target environment received through the application service center interface.

13. The system of claim 11, further comprising:
mapping rules configured to determine the target environment from the source environment.

14. The system of claim 11, where:
the application configuration circuitry is configured to issue provisioning instructions for instantiating the application database in the target environment.

15. The system of claim 11, where:
the application configuration circuitry is configured to issue provisioning instructions for instantiating the application database into the target environment as a virtualized application database.

16. The system of claim 11, further comprising:
masked data field identifiers that identifying specific data fields in the application database as masked data fields; and where:
the application configuration circuitry is configured to prevent data entries in the masked data fields from appearing in the application database in the target environment.

17. A system comprising:
machine interface circuitry defining an application service center interface as a set of graphical user interfaces;

a communication interface circuitry configured to deliver the application service center interface to an application owner; and application configuration circuitry configured to:
- control application migration of a specific application through the application service center interface by:
  - responsive to operator input at the application service center interface, identifying an application database required for execution of the specific application, the operator input including a request to register the application database for the specific application;
  - identifying a source environment in which the specific application currently runs;
  - assigning the specific application to an application-specific metadata model;
  - adding, into the application-specific metadata model, application database location metadata characterizing the application database;
  - adding, into the application-specific metadata model, source environment metadata that characterizes the source environment in which the specific application currently runs; and
- initiate migration of the specific application through the application service center interface by:
  - deriving a target environment for the specific application from the source environment metadata by:
    - generating multiple different hardware mappings to the target environment for a hardware component accessible within the source environment;
    - providing individual ones of the multiple different hardware mappings to respective accept-mapping selectors within the application service center interface to facilitate an operator selection among the multiple different hardware mappings via an input device, each of the accept-mapping selectors detailing a different hardware configuration, each of the different hardware mappings including:
      - a specific number of processor cores;
      - a specific amount of disk space; and
      - a specific amount of Random Access Memory (RAM);
    - for each hardware component in the individual ones of the multiple different hardware mappings, providing a listing of alternate mappings for the hardware component for display at a time of selection of a graphical user interface (GUI) element within the application service center interface;
  - providing a listing of pending items to a pending items panel in the application service center interface, the pending items including instances of hardware components for which provisioning is currently pending;
  - for each of the pending items, providing a change request indicator displayed separately from the listing, the change request indicator configured to open a detail view responsive to operator input, the detail view including an option to request a change to the respective pending item, the option to request the change including an option to change:
    - a priority of the pending item;
    - a requestor name for the pending item;
    - a risk level for the pending item;
    - an impact level for the pending item;
    - a configuration item for the pending item;
    - a category for the pending item;
    - a state for the pending item;
    - an assigned group for the pending item;
    - an authorization approval of the pending item; and
    - a description of the pending item;
  - requesting deployment of the target environment for the specific application;
  - recognizing that the specific application relies on the application database for its functionality; and
  - controlling a joint migration of the application database and the specific application into the target environment.

18. The system of claim 17, where:
the application configuration circuitry is further configured to:
executing a post-migration configuration on the specific application in the target environment, including configuring the specific application to access the application database in the target environment.

19. The system of claim 17, where:
the application configuration circuitry is configured to issue provisioning instructions for instantiating the application database in the target environment.

20. The system of claim 17, where:
the application configuration circuitry is configured to issue provisioning instructions for instantiating the application database into the target environment as a virtualized application database.

* * * * *